(12) United States Patent
Choi et al.

(10) Patent No.: US 11,537,232 B2
(45) Date of Patent: Dec. 27, 2022

(54) ELECTRONIC DEVICE

(71) Applicant: Samsung Display Co., Ltd., Yongin-si (KR)

(72) Inventors: Wonjun Choi, Seoul (KR); Il-Joo Kim, Hwaseong-si (KR); Deokjung Kim, Busan (KR); Wonkyu Kwak, Seongnam-si (KR); Youngbae Jung, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/150,074

(22) Filed: Jan. 15, 2021

(65) Prior Publication Data
US 2021/0318774 A1    Oct. 14, 2021

(30) Foreign Application Priority Data

Apr. 13, 2020    (KR) .................. 10-2020-0044862

(51) Int. Cl.
*G06F 3/041* (2006.01)
(52) U.S. Cl.
CPC .................. *G06F 3/0416* (2013.01)
(58) Field of Classification Search
None
See application file for complete search history.

(56) References Cited

U.S. PATENT DOCUMENTS

| 9,582,087 | B2 | 2/2017 | Kang | |
|---|---|---|---|---|
| 10,488,966 | B2 | 11/2019 | Rhe et al. | |
| 10,635,211 | B2 | 4/2020 | Kim et al. | |
| 2015/0138041 | A1* | 5/2015 | Hirakata | H01L 27/3276 345/1.3 |
| 2017/0228068 | A1* | 8/2017 | Pu | G06F 3/04164 |
| 2018/0032188 | A1* | 2/2018 | Park | G06F 3/0443 |
| 2018/0348929 | A1* | 12/2018 | Rhe | G06F 3/0412 |
| 2019/0265824 | A1* | 8/2019 | Abe | G06F 3/0443 |
| 2021/0173505 | A1 | 6/2021 | Choi et al. | |
| 2021/0173518 | A1 | 6/2021 | Moon et al. | |
| 2021/0173525 | A1 | 6/2021 | Han et al. | |

FOREIGN PATENT DOCUMENTS

| KR | 10-2018-0119196 | 11/2018 |
|---|---|---|
| KR | 10-2018-0131764 | 12/2018 |
| KR | 10-2021564 | 9/2019 |
| KR | 10-2021-0070454 | 6/2021 |
| KR | 10-2021-0070457 | 6/2021 |
| KR | 10-2021-0070459 | 6/2021 |

\* cited by examiner

*Primary Examiner* — Stephen T. Reed
(74) *Attorney, Agent, or Firm* — H.C. Park & Associates, PLC

(57) ABSTRACT

An electronic device includes: a display panel having an active area in which a plurality of pixels are disposed and a peripheral area disposed around the active area; a plurality of sensing electrodes disposed in the active area; and a first sensing line connected to one of the plurality of sensing electrodes and including a first portion disposed in the peripheral area, a second portion extending from the first portion and disposed in the active area, and a third portion extending from the second portion and disposed in the peripheral area.

20 Claims, 20 Drawing Sheets

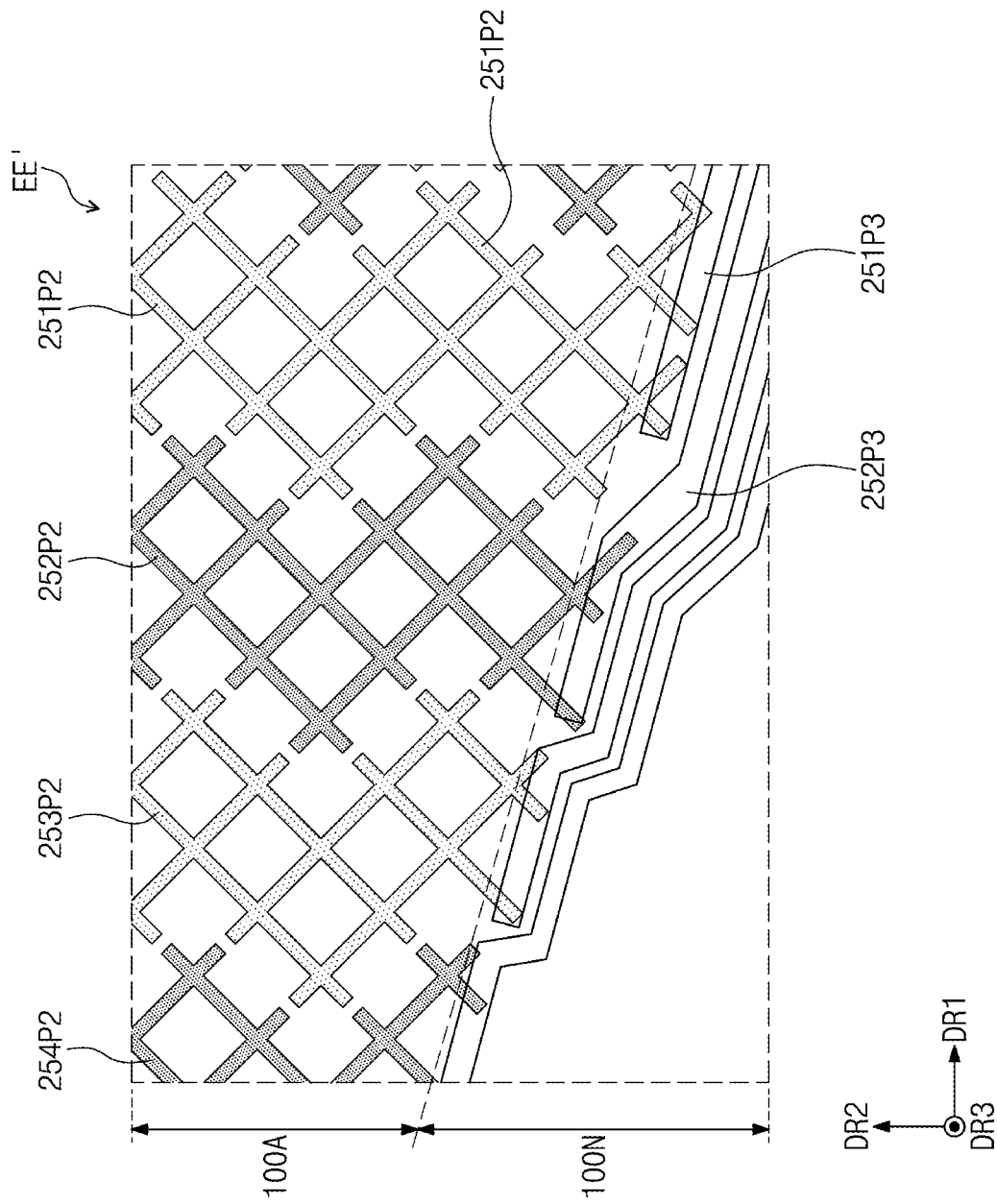

ELECTRONIC DEVICE

CROSS-REFERENCE TO RELATED APPLICATION

This application claims priority from and the benefit of Korean Patent Application No. 10-2020-0044862, which is hereby incorporated by reference for all purposes as if fully set forth herein.

BACKGROUND

Field

Example implementations of the present disclosure relate generally to an electronic device and more specifically, to an electronic device including a display panel and a sensor.

Discussion of the Background

An electronic device includes an active area that is activated according to an electrical signal. The electronic device may sense an input applied from the outside through the active area and simultaneously display various images to provide information to a user. In recent years, as electronic devices having various shapes are developed, active areas having various shapes have been implanted in the electronic devices.

The above information disclosed in this Background section is only for understanding of the background of the inventive concepts, and, therefore, it may contain information that does not constitute prior art.

SUMMARY

Applicant has realized that as a peripheral area of an electronic device having a sensor is decreased, and an active area of the electronic device is increased, there is insufficient area for forming a plurality of sensing lines of the sensor in the peripheral area of the electronic device.

Electronic devices having a sensor constructed according to the principles and example implementations of the present disclosure are capable of providing the sensor having improved sensing sensitivity by forming a plurality of sensing lines of the sensor in an active area of the electronic devices.

In addition, electronic devices constructed according to the principles and example implementations of the present disclosure include a display panel having a reduced peripheral area and a sensor disposed on the display panel.

Additional features of the inventive concepts will be set forth in the description which follows, and in part will be apparent from the description, or may be learned by practice of the inventive concepts.

According to an example embodiment, an electronic device includes: a display panel having an active area in which a plurality of pixels are disposed and a peripheral area disposed around the active area; a plurality of sensing electrodes disposed in the active area; and a first sensing line connected to one of the plurality of sensing electrodes and including a first portion disposed in the peripheral area, a second portion extending from the first portion and disposed in the active area, and a third portion extending from the second portion and disposed in the peripheral area.

The electronic device may further include a second sensing line connected to another of the plurality of sensing electrodes and including a fourth portion disposed in the peripheral area, a fifth portion extending from the fourth portion and disposed in the active area, and a sixth portion extending from the fifth portion and disposed in the peripheral area, wherein the fourth portion of the second sensing line in the active area may be closer to the peripheral area than the second portion of the first sensing line in the active area when viewed in plane.

The second portion of the first sensing line in the active area may have a length greater than that of the fifth portion of the second sensing line in the active area.

The second portion of the first sensing line in the active area may have a width less than that of the fifth portion of the second sensing line in the active area.

The second portion of the first sensing line in the active area may have resistance greater than that of the fifth portion of the second sensing line in the active area.

Each of the second portion of the first sensing line in the active area and the fifth portion of the second sensing line in the active area may have a mesh structure.

A mesh line of the second portion of the first sensing line in the active area may have a width equal to or less than that of a mesh line of the fifth portion of the second sensing line in the active area.

Each of the plurality of sensing electrodes may include a plurality of sensing patterns and a plurality of connection patterns, and the second portion of the first sensing line in the active area and the plurality of sensing patterns may be disposed on a same layer and may include a same material.

The electronic device may further include a dummy electrode disposed between the second portion of the first sensing line in the active area and the plurality of sensing patterns.

Each of the plurality of sensing electrodes may include a plurality of sensing patterns and a plurality of connection patterns, and the second portion of the first sensing line in the active area may be disposed at a different level from the plurality of sensing patterns in a cross-sectional view.

A boundary may be disposed between the active area and the peripheral area, and the boundary may include a partially curved boundary.

The second portion of the first sensing line in the active area may be spaced apart from the peripheral area by the partially curved boundary therebetween when viewed in plane.

The electronic device may further include a second sensing line connected to another of the plurality of sensing electrodes and spaced apart from the second portion by the partially curved boundary therebetween.

The display panel may be bent with respect to: a first bending axis extending in a first direction; a second bending axis extending in the first direction and spaced apart from the first bending axis in a second direction intersecting the first direction; a third bending axis extending in the second direction; and a fourth bending axis extending in the second direction and spaced apart from the third bending axis in the first direction, wherein the active area may overlap the first bending axis, the second bending axis, the third bending axis, and the fourth bending axis when viewed in plane.

According to another example embodiment, an electronic device includes: a display panel having an active area configured to display an image, a peripheral area disposed around the active area, and a partially curved boundary between the active area and the peripheral area; and a sensor including a plurality of sensing electrodes disposed in the active area and a plurality of sensing lines electrically connected to the plurality of sensing electrodes, respectively, wherein: the plurality of sensing lines include a first sensing line electrically connected to one of the plurality of sensing electrodes, and a connection portion of the first sensing line is spaced apart from the peripheral area by the partially curved boundary therebetween when viewed in plane.

The plurality of sensing lines may further include a second sensing line electrically connected to another of the plurality of sensing electrodes, a connection portion of the second sensing line may be disposed between the partially curved boundary and the connection portion of the first sensing line when viewed in plane, and the connection portion of the second sensing line may have a resistance value less than that of the connection portion of the first sensing line.

The connection portion of the first sensing line may have a length greater than that of the connection portion of the second sensing line.

The connection portion of the first sensing line may have a width less than that of the connection portion of the second sensing line.

Each of the connection portion of the first sensing line and the connection portion of the second sensing line may have a mesh structure, and a mesh line of the connection portion of the first sensing line may have a width equal to or less than that of a mesh line of the connection portion of the second sensing line.

Each of the plurality of sensing electrodes may include a plurality of sensing patterns and a plurality of connection patterns, and the connection portion of the first sensing line, the connection portion of the second sensing line, and the plurality of sensing electrodes may be disposed on a same layer or are disposed at different levels in a cross-sectional view.

It is to be understood that both the foregoing general description and the following detailed description are exemplary and explanatory and are intended to provide further explanation of the present disclosure as claimed.

BRIEF DESCRIPTION OF THE DRAWINGS

The accompanying drawings, which are included to provide a further understanding of the present disclosure and are incorporated in and constitute a part of this specification, illustrate example embodiments of the present disclosure, and together with the description serve to explain the inventive concepts.

FIG. 10 is an enlarged plan view of area EE' of FIG. 8A.

DETAILED DESCRIPTION

Figure 1A:
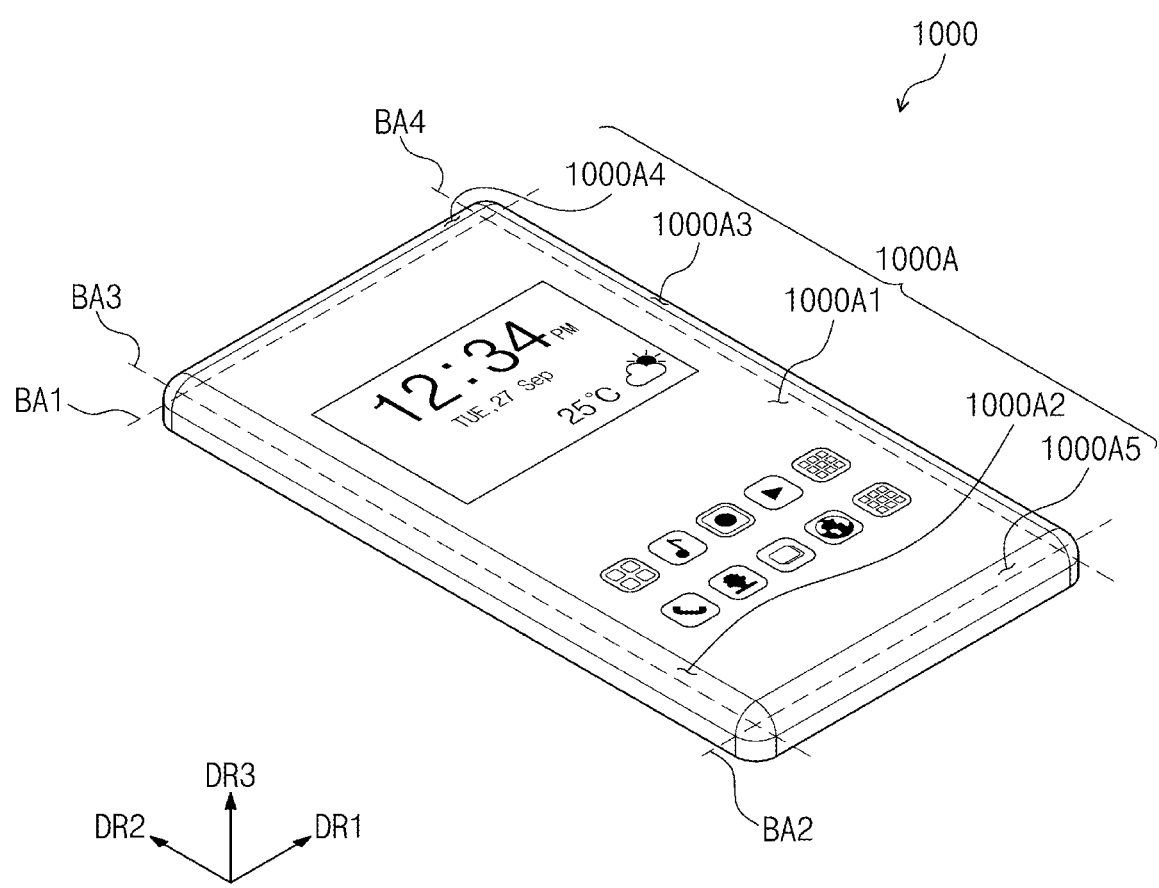
FIG. 1A is a perspective view of an example embodiment of an electronic device constructed according to an embodiment of the present disclosure.

In the following description, for the purposes of explanation, numerous specific details are set forth in order to provide a thorough understanding of various example embodiments or implementations of the present disclosure. As used herein "embodiments" and "implementations" are interchangeable words that are non-limiting examples of devices or methods employing one or more of the inventive concepts disclosed herein. It is apparent, however, that various example embodiments may be practiced without these specific details or with one or more equivalent arrangements. In other instances, well-known structures and devices are shown in block diagram form in order to avoid unnecessarily obscuring various example embodiments. Further, various example embodiments may be different, but do not have to be exclusive. For example, specific shapes, configurations, and characteristics of an example embodiment may be used or implemented in another example embodiment without departing from the inventive concepts.

Unless otherwise specified, the illustrated example embodiments are to be understood as providing example features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an example embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the x, y, and z-axes, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the example term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various example embodiments are described herein with reference to sectional and/or exploded illustrations that are schematic illustrations of idealized example embodiments and/or intermediate structures. As such, variations from the shapes of the illustrations as a result, for example, of manufacturing techniques and/or tolerances, are to be expected. Thus, example embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1A is a perspective view of an example embodiment of an electronic device constructed according to an embodiment of the present disclosure.

Referring to FIG. 1A, an electronic device 1000 may be activated according to an electrical signal. For example, the electronic device 1000 may be, e.g., a mobile phone, a tablet computer, a navigation unit, a game console, or a wearable device, but example embodiments are not limited thereto. FIG. 1A exemplarily illustrates that the electronic device 1000 is a mobile phone.

The electronic device 1000 may display an image through an active area 1000A. The active area 1000A may have a shape bent with respect to four bending axes BA1, BA2, BA3, and BA4.

The active area 1000A may include a main display surface 1000A1 and curved surfaces 1000A2, 1000A3, 1000A4, and 1000A5 bent while extending from the main display surface 1000A1. The main display surface 1000A1 may have a rectangular shape substantially parallel to a plane defined by a first direction DR1 and a second direction DR2. The bent curved surfaces 1000A2, 1000A3, 1000A4, and 1000A5 may be bent while extending from four sides of the main display surface 1000A1, respectively.

The curved surfaces 1000A2, 1000A3, 1000A4, and 1000A5 may include a first curved surface 1000A2, a second curved surface 1000A3, a third curved surface 1000A4, and a fourth curved surface 1000A5. The first curved surface 1000A2 and the second curved surface 1000A3 may be spaced apart from each other in the first direction DR1 by the main display surface 1000A1 therebetween, and the third curved surface 1000A4 and the fourth curved surface 1000A5 may be spaced apart from each other in the second direction DR2 by the main display surface 1000A1 therebetween.

Each of the first and second bending axes BA1 and BA2 may extend along the first direction DR1, and each of the third and fourth bending axes BA3 and BA4 may extend along the second direction DR2. The first curved surface 1000A2 may extend from the main display surface 1000A1 and be bent with respect to the third bending axis BA3. The second curved surface 1000A3 may extend from the main display surface 1000A1 and be bent with respect to the fourth bending axis BA4. The third curved surface 1000A4 may extend from the main display surface 1000A1 and be bent with respect to the first bending axis BA1. The fourth curved surface 1000A5 may extend from the main display surface 1000A1 and be bent with respect to the second bending axis BA2.

The electronic device 1000 may have a thickness direction that is substantially parallel to a third direction DR3 intersecting the first direction DR1 and the second direction DR2. Thus, a front surface (e.g., a top surface) and a rear surface (e.g., a bottom surface) of members of the electronic device 1000 may be defined with respect to the third direction DR3. In this specification, a feature of when viewed in plane or on plane may represent a feature of when viewed in a direction parallel to the third direction DR3.

Figure 1B:
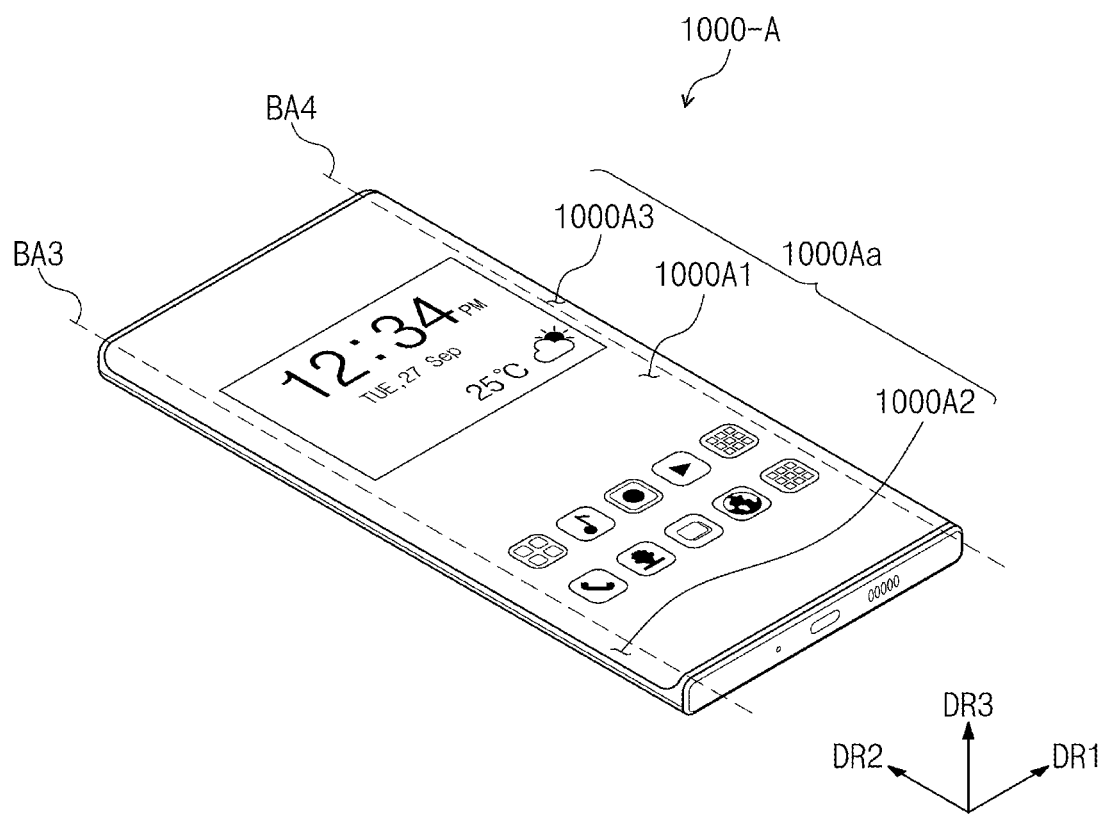
FIG. 1B is a perspective view of another example embodiment of an electronic device constructed according to an embodiment of the present disclosure.

FIG. 1B is a perspective view of another example embodiment of an electronic device constructed according to an embodiment of the present disclosure.

Referring to FIG. 1B, an active area 1000Aa of an electronic device 1000-A may include a main display surface 1000A1 and curved surfaces 1000A2 and 1000A3 bent while extending from two sides, which face each other, of the main display surface 1000A1, respectively. For example, the active area 1000Aa may include the main display surface 1000A1, a first curved surface 1000A2, and a second curved surface 1000A3.

For example, the active area 1000A and 1000Aa of the electronic device 1000 and 1000-A includes a plurality of curved surfaces as an example in each of FIGS. 1A and 1B, but example embodiments are not limited thereto. For example, the active area 1000Aa may include only the main display surface 1000A1. For example, the active area 1000Aa may include the main display surface 1000A1 and only one curved surface or three curved surfaces.

Figure 2:
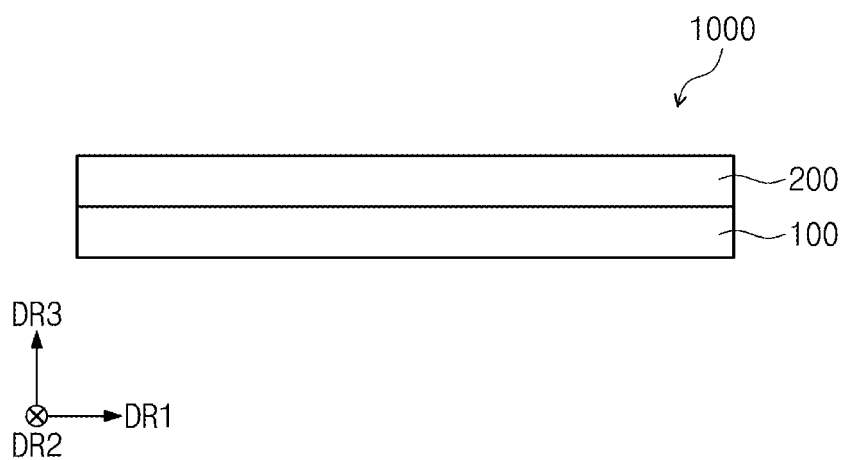
FIG. 2 is a cross-sectional view illustrating a partial configuration of the electronic device of FIG. 1A or 1B.

FIG. 2 is a cross-sectional view of a partial configuration of the electronic device of FIG. 1A or 1B.

Referring to FIG. 2, the electronic device 1000 may include a display panel 100 and a sensor 200.

The display panel 100 may be a component that substantially generates an image. The display panel 100 may be a light emitting display panel. For example, the display panel 100 may be an organic light emitting display panel, a quantum dot light emitting display panel, a micro-LED display panel, or a nano-LED display panel. Alternatively, the display panel 100 may be a light receiving display panel. For example, the display panel 100 may be a liquid crystal display panel.

The sensor 200 may be disposed on the display panel 100. The sensor 200 may sense an external input applied from the outside. The external input may be an input of a user. For example, the input of the user may include various types of external inputs such as a portion of a user's body, light, heat, a pen, or pressure.

The sensor 200 may be provided on the display panel 100 through a continuous process. In this case, the sensor 200 may be directly disposed on the display panel 100. For example, a feature of being "directly disposed" means that an additional member is not disposed between the sensor 200 and the display panel 100. For example, an additional adhesive member may not be disposed between the sensor 200 and the display panel 100.

Alternatively, the sensor 200 may be coupled with the display panel 100 through an adhesive member. The adhesive member may include a typical adhesive or sticking agent.

For example, the adhesive member may be a transparent adhesive member such as a pressure sensitive adhesive film (PSA), an optically clear adhesive film (OCA), or an optically clear resin (OCR).

For example, the electronic device 1000 may further include a window disposed on the sensor 200. The window may include an optically clear insulating material, e.g., glass or plastic. The window may have a single-layer structure or a multi-layer structure.

Figure 3:
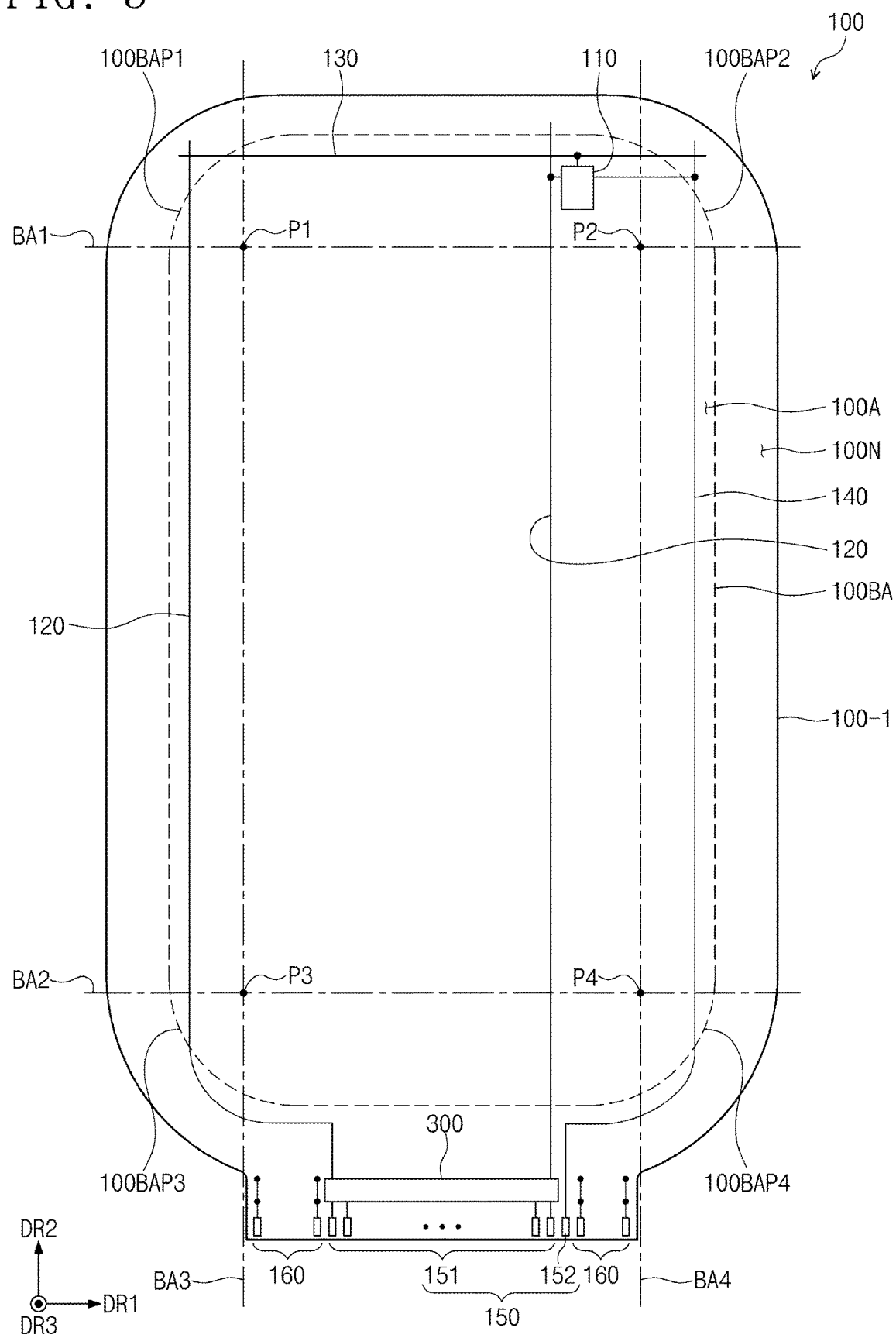
FIG. 3 is a plan view of a display panel of FIG. 2.

FIG. 3 is a plan view of a display panel of FIG. 2.

Referring to FIG. 3, an active area 100A and a peripheral area 100N may be defined on the display panel 100. The active area 100A may be activated according to an electrical signal. For example, the active area 100A may display an image. The peripheral area 100N may surround the active area 100A. A driving circuit or a driving line for driving the active area 100A may be disposed in the peripheral area 100N.

A boundary 100BA may be defined between the active area 100A and the peripheral area 100N. The boundary 100BA may include first, second, third, and fourth partial boundaries 100BAP1, 100BAP2, 100BAP3, and 100BAP4 each having a finite radius of curvature. For example, the radii of the first, second, third, and fourth partial boundaries 100BAP1, 100BAP2, 100BAP3, and 100BAP4 may be different from each other. For example, the radii of the first, second, third, and fourth partial boundaries 100BAP1, 100BAP2, 100BAP3, and 100BAP4 may be same as each other. The third partial boundary 100BAP3 and the fourth partial boundary 100BAP4 may be closer to a plurality of sensing pads 160 than the first partial boundary 100BAP1 and the second partial boundary 100BAP2. For example, the first, second, third, and fourth partial boundaries 100BAP1, 100BAP2, 100BAP3, and 100BAP4 may be partially curved boundaries of the boundary 100BA. For example, the first, second, third, and fourth partial boundaries 100BAP1, 100BAP2, 100BAP3, and 100BAP4 may be disposed at corners of the boundary 100BA.

The first, second, third, and fourth bending axes BA1, BA2, BA3, and BA4 may overlap the active area 100A. A first point P1 at which the first bending axis BA1 intersects the third bending axis BA3, a second point P2 at which the first bending axis BA1 intersects the fourth bending axis BA4, a third point P3 at which the second bending axis BA2 intersects the third bending axis BA3, and a fourth point P4 at which the second bending axis BA2 intersects the fourth bending axis BA4 may be defined in the active area 100A.

The first point P1 may be adjacent to the first partial boundary 100BAP1, the second point P2 may be adjacent to the second partial boundary 100BAP2, the third point P3 may be adjacent to the third partial boundary 100BAP3, and fourth point P4 may be adjacent to the fourth partial boundary 100BAP4.

In an example embodiment, when the display panel 100 is bent with respect to the first, second, third, and fourth bending axes BA1, BA2, BA3, and BA4, an area of the peripheral area 100N adjacent to the first, second, third, and fourth partial boundaries 100BAP1, 100BAP2, 100BAP3, and 100BAP4 may be decreased as compared to a case of when the display panel 100 is not bent.

The display panel 100 may include a base layer 100-1, a plurality of pixels 110, a plurality of signal lines 120, 130, and 140, a plurality of display pads 150, and a plurality of sensing pads 160.

The base layer 100-1 may include a synthetic resin film. The synthetic resin film may include a thermosetting resin. The base layer 100-1 may have a multi-layer structure. For example, the base layer 100-1 may have a three-layer structure of a synthetic resin layer, an adhesive layer, and a synthetic resin layer. For example, the synthetic resin layer may include a polyimide-based resin layer, but example embodiments are not limited thereto. The synthetic resin layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyamide-based resin, and a perylene-based resin. For example, the base layer 100-1 may include a glass substrate or an organic/inorganic composite substrate.

The pixels 110 may be disposed in the active area 100A. The signal lines 120, 130, and 140 are connected to the pixels 110 and transmit electrical signals to the pixels 110. Referring to FIG. 3, the signal lines 120, 130, and 140 include a data line 120, a scan line 130, and a power line 140. However, example embodiments are not limited thereto. For example, the signal lines 120, 130, and 140 may further include at least one of an initialization voltage line and a light emitting control line.

Each of the pixels 110 may include a pixel circuit and a light emitting element. The pixel circuit may include at least one transistor and at least one capacitor. The light emitting element may include an organic light emitting diode, a micro-sized light emitting diode, or a nano-sized light emitting diode.

The display pads 150 may include a first pad 151 and a second pad 152. The first pad 151 may be provided in plurality, and the plurality of first pads 151 may be connected to the data lines 120, respectively. The second pad 152 may be electrically connected to the power line 140. For example, the second pad 152 may be electrically connected to the power line 140 through a power pattern.

The display panel 100 may provide electrical signals, which are provided from the outside through the display pads 150, to the pixels 110. For example, the display pads 150 may further include pads for receiving other electrical signals in addition to the first pad 151 and the second pad 152. However, example embodiments are not limited thereto.

A driving chip 300 may be mounted in the peripheral area 100N of the display panel 100. The driving chip 300 may be a chip-type timing control circuit and/or may include a processor. In this case, the data lines 120 may be electrically connected to the first pads 151 through the driving chip 300. However, example embodiments are not limited thereto. For example, the driving chip 300 may be mounted on a film separated from the display panel 100. In this case, the driving chip 300 may be electrically connected to the display pads 150 through the film.

The plurality of sensing pads 160 may be electrically connected to sensing electrodes of the sensor, which will be described later. Among the plurality of sensing pads 160, some sensing pads and other sensing pads may be spaced apart from each other by the display pads 150 therebetween. However, example embodiments are not limited thereto. An arrangement relationship between the sensing pads 160 and the display pads 150 may be variously changed.

Figure 4:
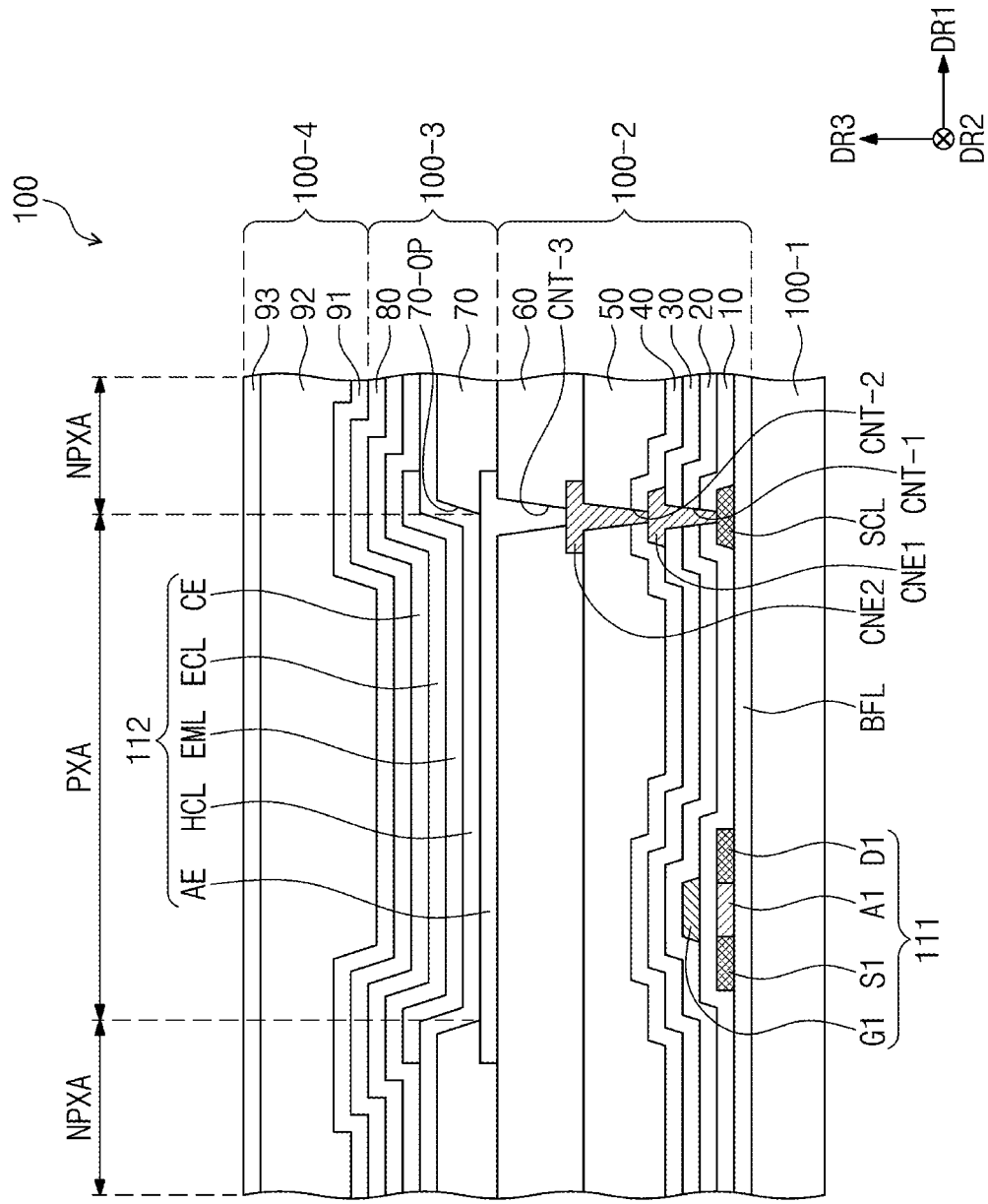
FIG. 4 is a cross-sectional view illustrating the display panel of FIG. 2.

FIG. 4 is a cross-sectional view illustrating the display panel of FIG. 2.

Referring to FIG. 4, the display panel 100 may include a plurality of insulation layers, a semiconductor pattern, a conductive pattern, and a signal line. An insulation layer, a semiconductor layer, and a conductive layer are provided by a method such as coating or deposition. Thereafter, the insulation layer, the semiconductor layer, and the conductive layer may be selectively patterned by a photolithography method. Through the above-described method, the semiconductor pattern, the conductive pattern, the signal line, etc., formed in a circuit layer 100-2 and a display element layer 100-3 are provided. Thereafter, an encapsulation layer 100-4 covering the display element layer 100-3 may be provided.

At least one inorganic layer is provided on a top surface of the base layer 100-1. The inorganic layer may include at least one of an aluminum oxide, a titanium oxide, a silicon oxide, a silicon oxynitride, a zirconium oxide, and a hafnium oxide. The inorganic layer may have multiple layers. The multi-layered inorganic layers may provide a barrier layer and/or a buffer layer. In the example embodiment, the display panel 100 includes a buffer layer BFL.

The buffer layer BFL improves a coupling force between the base layer 100-1 and the semiconductor pattern. The buffer layer BFL may include a silicon oxide layer and a silicon nitride layer, and the silicon oxide layer and the silicon nitride layer may be alternately laminated with each other.

The semiconductor pattern may be disposed on the buffer layer BFL. The semiconductor pattern may include polysilicon. However, example embodiments are not limited thereto. For example, the semiconductor pattern may include amorphous silicon or oxide semiconductor.

FIG. 4 merely illustrates a portion of the semiconductor pattern, and the semiconductor pattern may be further disposed on another area. The semiconductor pattern may be arranged over the pixels 110 (refer to FIG. 3) based on a particular rule. The semiconductor pattern may have an electrical property that is different according to whether doped or not therein. The semiconductor pattern may include a doped area and a non-doped area. The doped area may be doped with an n-type dopant or a p-type dopant. A p-type transistor may include a doped area that is doped with the p-type dopant, and an n-type transistor may include a doped area that is doped with the n-type dopant.

The doped area may have a conductivity greater than that of the non-doped area and substantially serve as an electrode or a signal line. The non-doped area substantially corresponds to an active (e.g., channel) of the transistor. In other words, one portion of the semiconductor pattern may be the active of the transistor, another portion may be a source or a drain of the transistor, and another portion may be a connection electrode or a connection signal line.

Each of the pixels 110 (refer to FIG. 3) may have an equivalent circuit including seven transistors, one capacitor, and a light emitting element, and the equivalent circuit of the pixel 110 may be changed in various ways. Referring to FIG. 4, each of the pixels may include one transistor 111 and one light emitting element 112.

A source S1, an active A1, and a drain D1 of the transistor 111 may be formed in the semiconductor pattern. The source S1 and the drain D1 may extend from the active A1 in opposite directions in a cross-section view. Referring to FIG. 4, a portion of a connection signal line SCL may be provided from the semiconductor pattern. For example, the connection signal line SCL may be connected to the drain D1 of the transistor 111 on a plane.

A first insulation layer 10 may be disposed on the buffer layer BFL. The first insulation layer 10 may overlap the plurality of pixels 110 in common and cover the semiconductor pattern. The first insulation layer 10 may be an inorganic layer and/or an organic layer and have a single-layer or multi-layer structure. The first insulation layer 10 may include at least one of an aluminum oxide, a titanium oxide, a silicon oxide, a silicon oxynitride, a zirconium oxide, and a hafnium oxide. In the example embodiment, the first insulation layer 10 may be a single-layered silicon oxide layer. In addition to the first insulation layer 10, an insulation layer of the circuit layer 100-2, which will be described later, may be an inorganic layer and/or an organic layer and have a single-layer or multi-layer structure. For example, the inorganic layer may include at least one of an aluminum oxide, a titanium oxide, a silicon oxide, a silicon oxynitride, a zirconium oxide, and a hafnium oxide, but example embodiments are not limited thereto.

A gate G1 of the transistor 111 is disposed on the first insulation layer 10. The gate G1 may be a portion of a metal pattern. The gate G1 overlaps the active A1. The gate G1 may serve as a mask in a process of doping the semiconductor pattern.

The second insulation layer 20 may be disposed on the first insulation layer 10 to cover the gate G1. The second insulation layer 20 may overlap the pixels 110 (refer to FIG. 3) in common. The second insulation layer 20 may be an inorganic layer and/or an organic layer and have a single-layer or multi-layer structure. In the example embodiment, the second insulation layer 20 may be a single-layered silicon oxide layer.

A third insulation layer 30 may be disposed on the second insulation layer 20, and in the example embodiment, the third insulation layer 30 may be a single-layered silicon oxide layer.

A first connection electrode CNE1 may be disposed on the third insulation layer 30. The first connection electrode CNE1 may be connected to the connection signal line SCL through a contact hole CNT-1 passing through the first, second, and third insulation layers 10, 20, and 30.

A fourth insulation layer 40 may be disposed on the third insulation layer 30. The fourth insulation layer 40 may be a single-layered silicon oxide layer. A fifth insulation layer 50 may be disposed on the fourth insulation layer 40. The fifth insulation layer 50 may be an organic layer.

A second connection electrode CNE2 may be disposed on the fifth insulation layer 50. The second connection electrode CNE2 may be connected to the first connection electrode CNE1 through a contact hole CNT-2 passing through the fourth insulation layer 40 and the fifth insulation layer 50.

A sixth insulation layer 60 may be disposed on the fifth insulation layer 50 to cover the second connection electrode CNE2. The sixth insulation layer 60 may be an organic layer.

The display element layer 100-3 including the light emitting element 112 may be disposed on the circuit layer 100-2. The light emitting element 112 may include a first electrode AE, a hole control layer HCL, a light emitting layer EML, an electron control layer ECL, and a second electrode CE.

The first electrode AE may be disposed on the sixth insulation layer 60. The first electrode AE may be connected to the second connection electrode CNE2 through a contact hole CNT-3 passing through the sixth insulation layer 60.

A pixel defining layer 70 may be disposed on the sixth insulation layer 60 to cover a portion of the first electrode AE. An opening 70-OP is defined in the pixel defining layer 70. The opening 70-OP of the pixel defining layer 70 exposes at least a portion of the first electrode AE.

As illustrated in FIG. 4, the active area 100A (refer to FIG. 3) may include a pixel area PXA and a non-pixel area NPXA disposed adjacent to the pixel area PXA. The non-pixel area NPXA may surround the pixel area PXA. In the example embodiment, the pixel area PXA may be defined in correspondence to a portion of the first electrode AE exposed by the opening 70-OP.

The hole control layer HCL may be disposed on the first electrode AE. The hole control layer HCL may be disposed on the pixel area PXA and the non-pixel area NPXA in common. The hole control layer HCL may include a hole transport layer and a hole injection layer.

The light emitting layer EML may be disposed on the hole control layer HCL. The light emitting layer EML may be disposed in an area corresponding to the opening 70-OP. For example, the light emitting layer EML may be separately provided on each of the pixels 110 (refer to FIG. 3). However, example embodiments are not limited thereto. For example, the light emitting layer EML may be disposed in the pixel area PXA and the non-pixel area NPXA in common as the hole control layer HCL. When the light emitting layer EML is separately provided in each of the pixels, each of the light emitting layers EML may emit light having at least one color of blue, red, and green. When the light emitting layer EML is disposed on the pixels 110 (refer to FIG. 3) in common, the light emitting layer EML may provide blue light or white light.

The electron control layer ECL may be disposed on the light emitting layer EML. The electron control layer ECL may include an electron transport layer and further include an electron injection layer. The hole control layer HCL and the electron control layer ECL may be provided on the plurality of pixels in common by using an open mask.

The second electrode CE may be disposed on the electron control layer ECL. The second electrode CE may have an integrated shape and be disposed in the plurality of pixels PX (refer to FIG. 3) in common.

A capping layer 80 may be disposed on the second electrode CE to contact the second electrode CE. The capping layer 80 may include an organic material. The capping layer 80 may protect the second electrode CE from a following process, e.g., a sputtering process, and improve a light emitting efficiency of the light emitting element 114. For example, the capping layer 80 may have a refractive index greater than that of a first inorganic layer 91, which will be described later, but example embodiments are not limited thereto. Alternatively, the capping layer 80 may be omitted.

The encapsulation layer 100-4 may be disposed on the display element layer 100-3. The encapsulation layer 100-4 may include a first inorganic layer 91, an organic layer 92, and a second inorganic layer 93. The first inorganic layer 91 and the second inorganic layer 93 protect the display element layer 100-3 from moisture/oxygen, and the organic layer 92 may protect the display element layer 100-3 from foreign substances such as dust particles. Each of the first inorganic layer 91 and the second inorganic layer 93 may include a silicon nitride layer, a silicon oxynitride layer, a silicon oxide layer, a titanium oxide layer, or an aluminum oxide layer. For example, the organic layer 92 may include an acrylic-based organic layer, but example embodiments are not limited thereto.

In an example embodiment, an inorganic layer, e.g., a LiF layer, may be further provided between the capping layer 80 and the first inorganic layer 91. The LiF layer may enhance the light emitting efficiency of the light emitting element 114.

Figure 5:
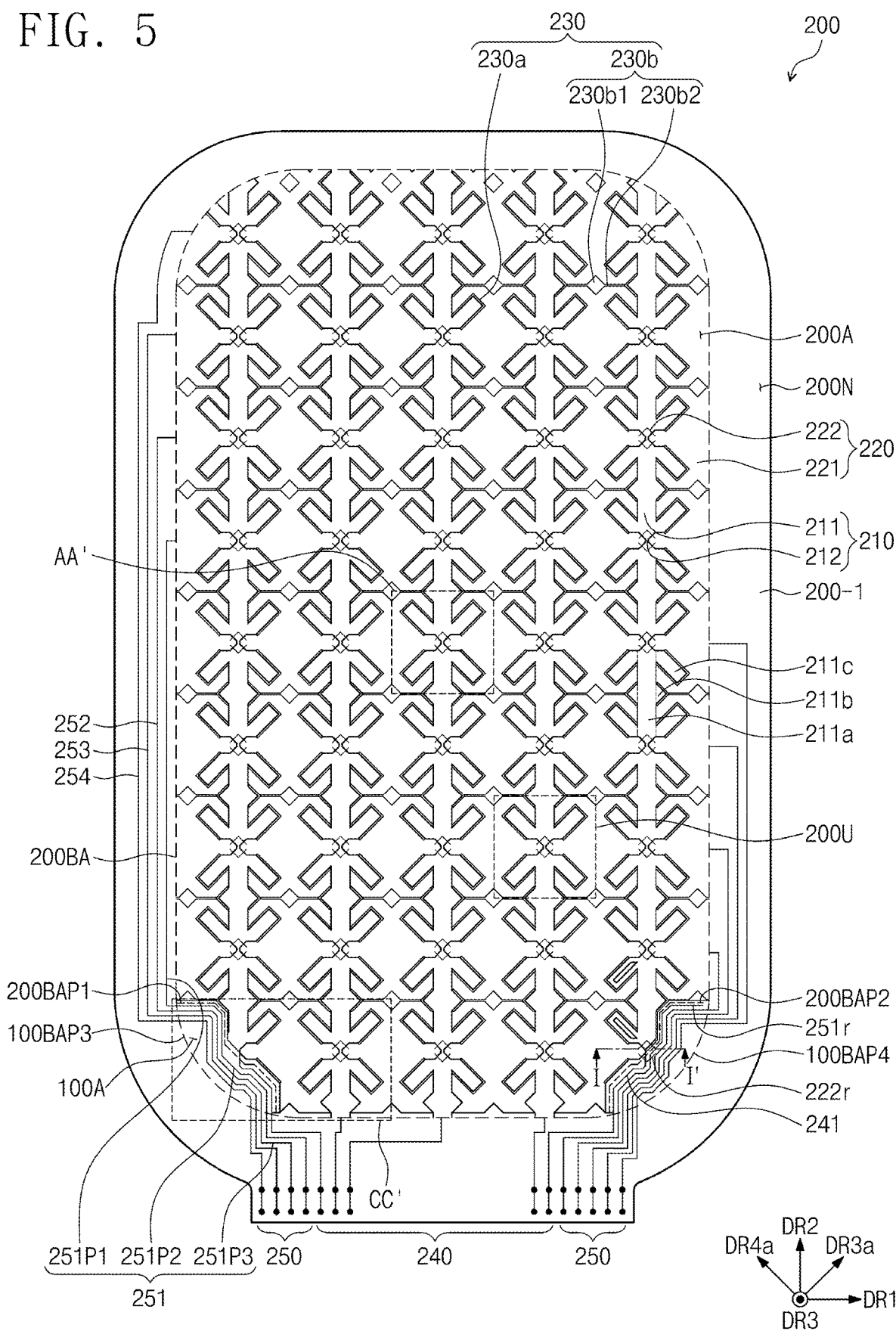
FIG. 5 is a plan view of an example embodiment of a sensor of FIG. 2.

FIG. 5 is a plan view of an example embodiment of a sensor of FIG. 2.

Referring to FIGS. 3 and 5, an active area 200A and a peripheral area 200N may be defined on the sensor 200. The active area 200A may be activated according to an electrical signal. For example, the active area 200A may sense an input, e.g., a contact input signal and a non-contact input signal. The peripheral area 200N may surround the active area 200A.

In an example embodiment, the active area 200A may have an area smaller than that of the active area 100A of the display panel 100. For example, a portion of the active area 100A of the display panel 100 may overlap the peripheral area 200N of the sensor 200. For example, a first portion of the active area 100A, which is adjacent to the third partial boundary 100BAP3, and a second portion of the active area 100A, which is adjacent to the fourth partial boundary 100BAP4, may overlap the peripheral area 200N of the sensor 200.

A boundary 200BA between the active area 200A and the peripheral area 200N may include a first partial boundary 200BAP1 and a second partial boundary 200BAP2. The first partial boundary 200BAP1 and the second partial boundary 200BAP2 may overlap the active area 100A of the display panel 100. The first portion of the active area 100A may be surrounded by the first partial boundary 200BAP1 and the third partial boundary 100BAP3. The second portion of the active area 100A may be surrounded by the second partial boundary 200BAP2 and the fourth partial boundary 100BAP4.

The sensor 200 may include a base insulation layer 200-1, first sensing electrodes 210, second sensing electrodes 220, dummy patterns 230, and sensing lines 240 and 250. The first sensing electrodes 210, the second sensing electrodes 220, and the dummy patterns 230 may be disposed in the active area 200A, and the sensing lines 240 and 250 may be disposed in the peripheral area 200N. The sensing lines 240 and 250 may be electrically connected to the plurality of sensing pads 160 through the contact holes, respectively.

The sensor 200 may obtain information of an external input based on a variation of a mutual capacitance between the first sensing electrodes 210 and the second sensing electrodes 220. The first sensing electrodes 210 may be arranged in the first direction DR1, and each of the first sensing electrodes 210 may extend in the second direction DR2. The second sensing electrodes 220 may be arranged in the second direction DR2, and each of the second sensing electrodes 220 may extend in the first direction DR1.

The first sensing electrodes 210 may include first sensing patterns 211 and first connection patterns 212. The first connection patterns 212 may electrically connect two adjacent first sensing patterns 211 to each other. The second sensing electrodes 220 may include second sensing patterns 221 and second connection patterns 222. The second connection patterns 222 may electrically connect two adjacent second sensing patterns 221 to each other. For example, the two adjacent second sensing patterns 221 may be connected to each other by two of the second connection patterns 222, but example embodiments are not limited thereto.

Each of the first sensing patterns 211 may include a first portion 211a, a second portion 211b, and a third portion 211c, which are connected to each other.

The first portion 211a may extend in the second direction DR2. The first portion 211a may have one end connected to one first connection pattern 212 and the other end connected to another first connection pattern 212. The first portion 211a may be referred to as a stem portion. Since the first connection patterns 212 and the first sensing patterns 211 have one connected structure, the first connection patterns 212 may be defined as one portion of the first portion 211a.

The second portion 211b may protrude from the first portion in the first direction DR1. For example, the second portion 211b may protrude in a direction away from a central area of the first portion 211a. The first portion 211a may be referred to as a projection portion.

The third portion 211c may be provided in plurality. The third portions 211c may extend from the first portion 211a in a first diagonal direction DR3a or a second diagonal direction DR4a. The third portions 211c may have one portion extending in the first diagonal direction DR3a and the other portion extending in the second diagonal direction DR4a. The third portions 211c may be referred to as branch portions.

The first diagonal direction DR3a crosses each of the first and second directions DR1 and DR2. For example, the first diagonal direction DR3a may be a direction between the first and second directions DR1 and DR2. The second diagonal direction DR4a may cross the first diagonal direction DR3a. For example, the first diagonal direction DR3a and the second diagonal direction DR4a may be perpendicular to each other.

Each of the second sensing patterns 221 may have a shape corresponding to that of each of the first sensing patterns 211. Each of the second sensing patterns 221 may surround at least two of the third portions 211c of each of the first sensing patterns 211 adjacent thereto.

However, example embodiments are not limited to the shape of each of the first sensing patterns 211 and the second sensing patterns 221. Each of the first sensing patterns 211 and the second sensing patterns 221 may have various shapes. For example, each of the first sensing patterns 211 and the second sensing patterns 221 may have a diamond shape.

The sensing lines 240 and 250 may be electrically connected to the first sensing electrodes 210 and the second sensing electrodes 220, respectively. The sensing lines 240 may be connected to the first sensing electrodes 210, and the sensing lines 250 may have one portion connected to left sides of one portion of the second sensing electrodes 220, respectively, and the other portion connected to right sides of the other portion of the second sensing electrodes 220, respectively. However, the example embodiment in FIG. 5 is not limited to the connection relationship between the sensing lines 240 and 250 and the first and second sensing electrodes 210 and 220.

According to an example embodiment, a partial sensing line 251 (hereinafter, referred to as a first sensing line) of the sensing lines 240 and 250 may overlap the active area 100A of the display panel 100. For example, when viewed in plane, a portion of the first sensing line 251 may be disposed between the boundary 100BA and the first and second sensing electrodes 210 and 220.

The first sensing line 251 may include a first portion 251P1, a second portion 251P2, and a third portion 251P3. The first portion 251P1 and the third portion 251P3 may be disposed in the peripheral area 100N of the display panel 100, and the second portion 251P2 may be disposed in the active area 100A of the display panel 100. The second portion 251P2 may be disposed between the third partial boundary 100BAP3 and the first partial boundary 200BAP1.

The first portion 251P1 may be electrically connected to the sensing electrode, e.g., the second sensing electrode 220, the second portion 251P2 may be electrically connected to the second sensing electrode 220 through the first portion 251P1, and the third portion 251P3 may be electrically connected to the second sensing electrode 220 through the first portion 251P1 and the second portion 251P2. The third portion 251P3 may be connected to the sensing pads 160.

According to an example embodiment, at least a portion of the sensing lines 240 and 250 may be disposed to overlap the active area 100A. As a portion of the sensing lines 240 and 250 is formed to overlap the active area 100A, an area on which the sensing lines 240 and 250 are disposed may be secured or guaranteed even when a size of the peripheral area 100N is reduced.

The dummy patterns 230 may be spaced apart from the first sensing patterns 211 and the second sensing patterns 221. The dummy patterns 230 may be provided through the same process as the first sensing patterns 211 and the second sensing patterns 221. Thus, the dummy patterns 230 may include the same material and have the same structure as the first sensing patterns 211 and the second sensing patterns 221. The dummy patterns 230 may be referred to as auxiliary patterns, supplementary patterns, sub-patterns, or boundary patterns.

The dummy patterns 230 may include a first dummy pattern 230a and a second dummy pattern 230b. The first dummy pattern 230a may be disposed between the first sensing pattern 211 and the second sensing pattern 221. The second dummy pattern 230b may be disposed between the second sensing patterns 221. For example, the second dummy pattern 230b may be disposed between two of the second sensing patterns 221, which are adjacent to each other in the second direction DR2, to space the two of the second sensing patterns 221 apart from each other.

The second dummy pattern 230b may include a first boundary pattern 230b1 and second boundary patterns 230b2. The first boundary pattern 230b1 may have a diamond shape when viewed in plane. The second boundary patterns 230b2 may be spaced apart from each other by the first boundary pattern 230b1 therebetween. Each of the second boundary patterns 230b2 may extend in the first direction DR1. The second boundary patterns 230b2 may be connected to the first boundary pattern 230b1 and the first dummy pattern 230a, respectively.

As the first dummy pattern 230a is disposed between the first sensing patterns 211 and the second sensing patterns 221, a boundary area between the first sensing patterns 211 and the second sensing patterns 221 may decrease in visibility. As the second dummy pattern 230b is disposed between the second sensing patterns 221, a boundary area between the second sensing patterns 221 may decrease in visibility.

One portion of the dummy patterns 230 may be a floating electrode that is not electrically connected to the first sensing patterns 211 and the second sensing patterns 221. Alternatively, one portion of the dummy patterns 230 may be grounded. Another portion of the dummy patterns 230 may be connected to the first sensing patterns 211 and the second sensing patterns 221 to enhance or improve a sensing sensitivity of the sensor 200.

Figure 6:
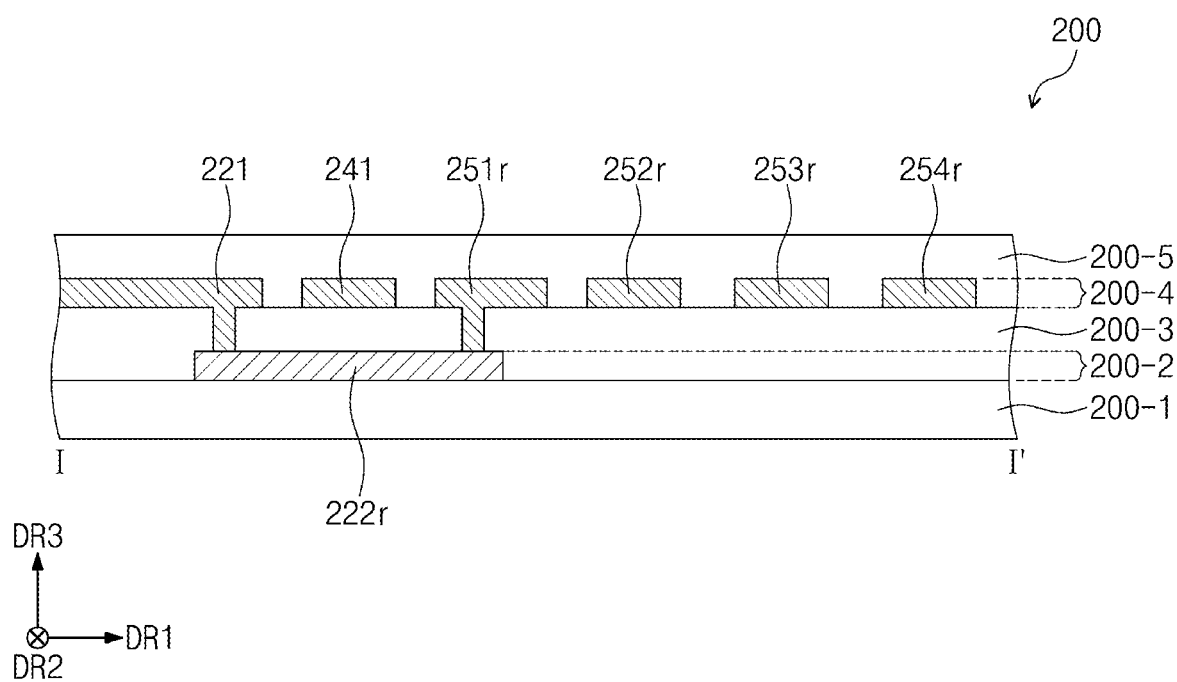
FIG. 6 is a cross-sectional view taken along line I-I' of FIG. 5.

FIG. 6 is a cross-sectional view taken along line I-I' of FIG. 5.

Referring to FIGS. 5 and 6, the sensor 200 may include a base insulation layer 200-1, a first conductive layer 200-2, a sensing insulation layer 200-3, a second conductive layer 200-4, and a cover insulation layer 200-5 in a cross-section view. The first conductive layer 200-2 may be disposed on the base insulation layer 200-1. The sensing insulation layer 200-3 may be disposed on the first conductive layer 200-2. The second conductive layer 200-4 may be disposed on the sensing insulation layer 200-3. The cover insulation layer 200-5 may be disposed on the second conductive layer 200-4.

The base insulation layer 200-1 may be an inorganic layer including one of a silicon nitride, a silicon oxynitride, a silicon oxide, and the like. Alternatively, the base insulation layer 200-1 may be an organic layer including an epoxy resin, an acrylic resin, imide-based resin, or the like. The base insulation layer 200-1 may have a single-layer structure or a lamination structure that is laminated or stacked in the third direction DR3.

The base insulation layer 200-1 may be provided directly on the display panel 100 (refer to FIG. 2). Alternatively, the base insulation layer 200-1 may be one component of the display panel 100 (refer to FIG. 2). Alternatively, the base insulation layer 200-1 may be provided on a separate base layer, and the base layer is coupled to the display panel 100 (refer to FIG. 2) through an adhesive member.

Each of the first conductive layer 200-2 and the second conductive layer 200-4 may have a single-layer structure or a multi-layer structure that is laminated in the third direction DR3.

The single-layered conductive layer may include a metal layer or a transparent conductive layer. The metal layer may include molybdenum, silver, titanium, copper, aluminum, an alloy thereof, and the like. The transparent conductive layer may include a transparent conductive oxide such as an indium tin oxide (ITO), an indium zinc oxide (IZO), a zinc oxide (ZnO), an indium zinc tin oxide (IZTO), and the like. Besides, the transparent conductive layer may include a conductive polymer such as PEDOT, a metal nano-wire, graphene, or the like.

The multi-layered conductive layer may include multi-layered metal layers. The multi-layered metal layers may have, e.g., a three-layer structure of titanium/aluminum/titanium. The multi-layered conductive layer may include at least one metal layer and at least one transparent conductive layer.

Each of the first conductive layer 200-2 and the second conductive layer 200-4 may include a portion of the first sensing patterns 211, the first connection patterns 212, the second sensing patterns 221, and the second connection patterns 222.

For example, the first conductive layer 200-2 may include second connection patterns 222 and 222r. The second conductive layer 200-4 may include the first sensing patterns 211, the second sensing patterns 221, the first connection patterns 212, and sensing lines 241, 251r, 252r, 253r, and 254r. For example, the first sensing patterns 211, the second sensing patterns 221, the first connection patterns 212, and the sensing lines 241, 251r, 252r, 253r, and 254r may be disposed on the same layer, e.g., the sensing insulation layer 200-3.

The first connection patterns 212 may be provided by the same process as the first sensing patterns 211. Thus, the first connection patterns 212 and the first sensing patterns 211 may include the same material and have the same lamination structure as each other. For example, the first connection patterns 212 and the first sensing patterns 211 may have one connected structure or a unity structure. The second connection patterns 222 and the second sensing patterns 221 may be disposed on different layers, respectively. Thus, the second sensing patterns 221 may be referred to as bridge patterns.

The sensing line 241 may be connected to the first sensing electrode 210, and the sensing lines 241, 251r, 252r, 253r, and 254r may be connected to the second sensing electrodes 220, respectively. Among the sensing lines, the sensing line 251r may be electrically connected to the second sensing pattern 221 through the second connection pattern 222r.

At least one of the sensing insulation layer 200-3 and the cover insulation layer 200-5 may include an inorganic layer. The inorganic layer may include at least one of an aluminum oxide, a titanium oxide, a silicon oxide, a silicon oxynitride, a zirconium oxide, a hafnium oxide, and the like.

At least one of the sensing insulation layer 200-3 and the cover insulation layer 200-5 may include an organic layer. The organic layer may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, a perylene-based resin, or the like.

Figure 7A:
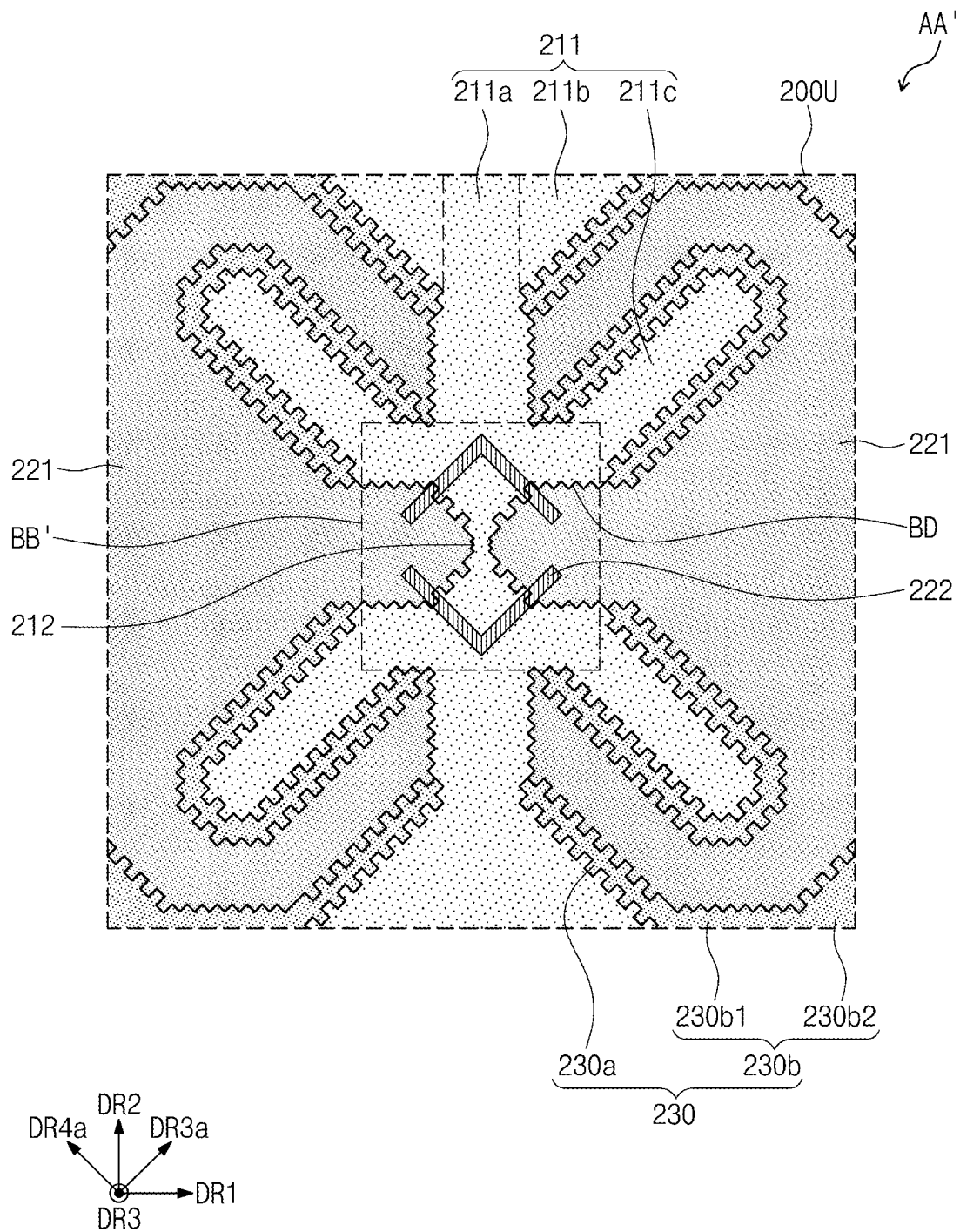
FIG. 7A is an enlarged plan view of area AA' of FIG. 5.
Figure 7B:
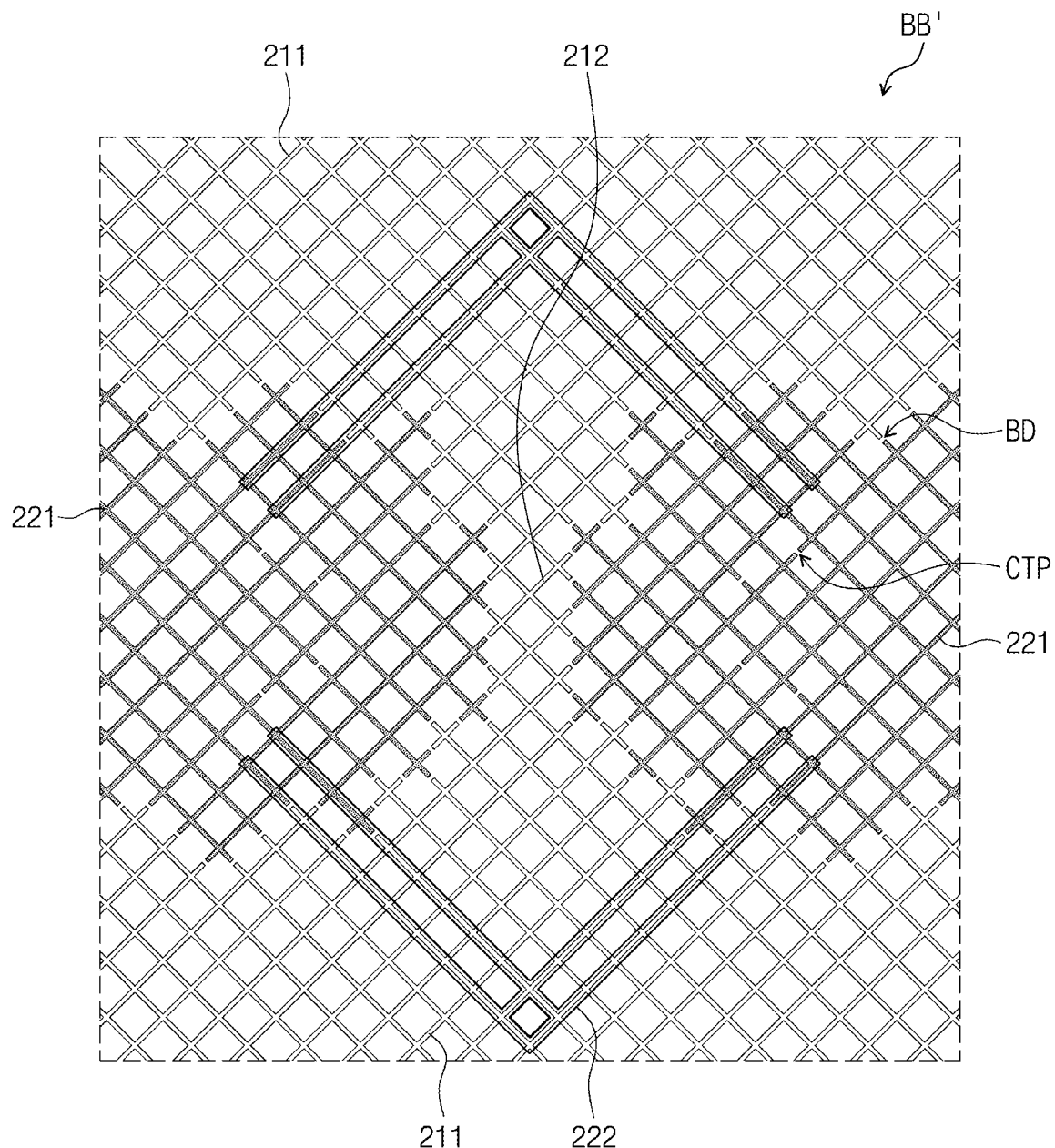
FIG. 7B is an enlarged plan view of area BB' of FIG. 7A.

FIG. 7A is an enlarged plan view of area AA' of FIG. 5. FIG. 7B is an enlarged plan view of area BB' of FIG. 7A.

Referring to FIGS. 7A and 7B, each of the first sensing patterns 211, the second sensing patterns 221, and the dummy patterns 230 may have a mesh structure (e.g., lattice structure). A boundary BD between the first sensing patterns 211, the second sensing patterns 221, and the dummy patterns 230 may be defined by removing a portion of the mesh structure.

In FIG. 7A, the boundary is illustrated by a solid line to illustrate the boundary BD. A portion obtained by removing a portion of the mesh structures in FIG. 7B may correspond to the boundary BD. For example, disconnected lines CTP obtained by removing a portion in the mesh structures may additionally prevent the boundary from being seen from the outside.

Referring to FIGS. 5, 7A, and 7B, the sensor 200 may include a plurality of sensing units 200U. The plurality of sensing units 200U may be disposed in the active area 200A. Each of the plurality of sensing units 200U may include a portion of each of two of first sensing patterns 211, a portion of each of two of the second sensing patterns 221, one first connection pattern 212, the second connection patterns 222, and the dummy patterns 230.

In each of the plurality of sensing units 200U, the third portions 211c (e.g., branch portions) may extend in a direction away from the second connection patterns 222 (e.g., bridge patterns). In each of the plurality of sensing units 200U, four third portions 211c may be disposed. The two of the third portions 211c may extend in the first diagonal direction DR3a, and the rest two of the third portions 211c may extend in the second diagonal direction DR4a.

Figure 8A:
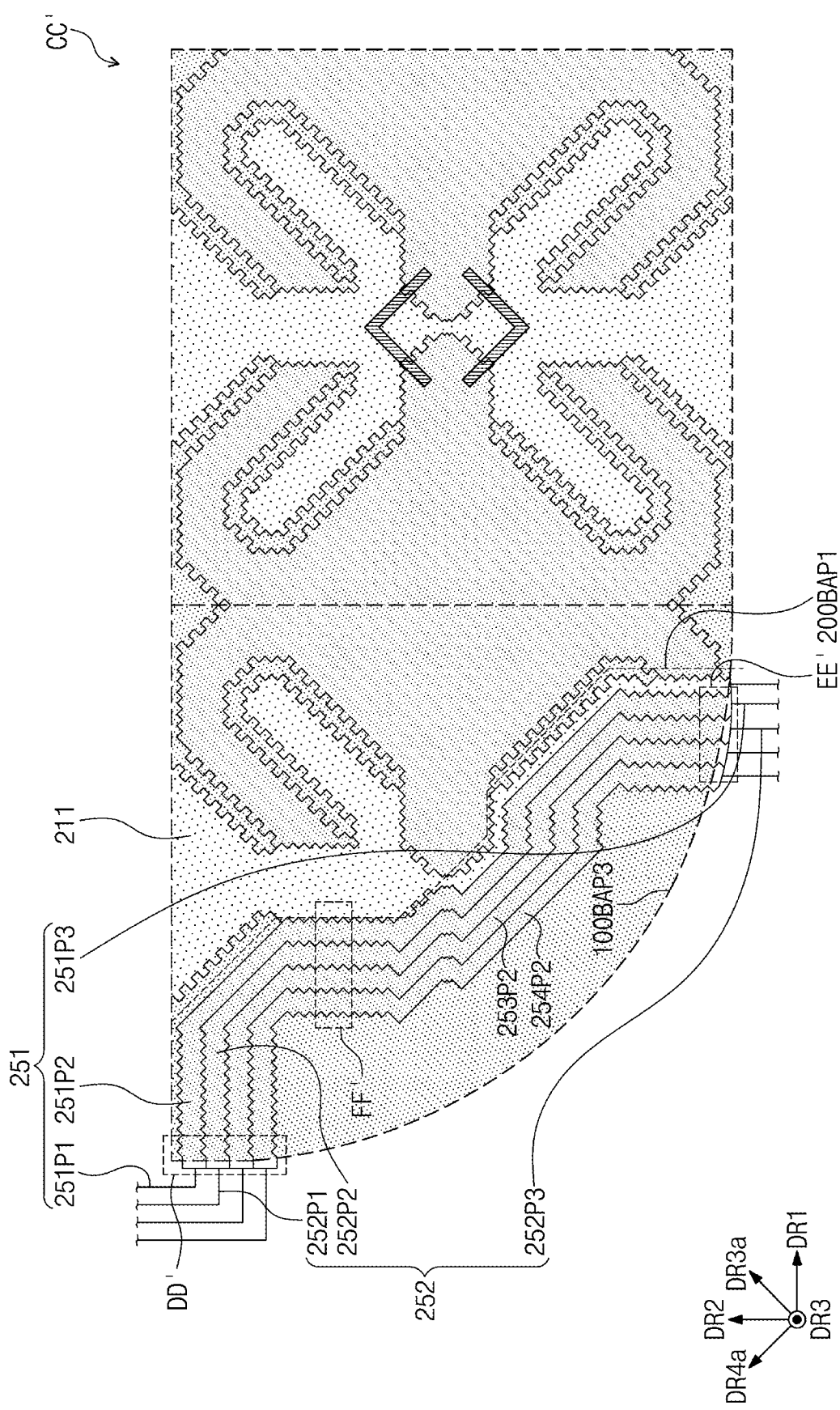
FIG. 8A is an enlarged plan view of area CC' in FIG. 5 illustrating an example embodiment of sensing lines and sensing electrodes of FIG. 5.

FIG. 8A is an enlarged plan view of area CC' in FIG. 5 illustrating an example embodiment of sensing lines and sensing electrodes of FIG. 5.

Referring to FIGS. 5 and 8A, the first sensing line 251, a second sensing line 252, a third sensing line 253, and a fourth sensing line 254 are illustrated. One portion of each of the first, second, third, and fourth sensing lines 251, 252, 253, and 254 may be disposed between the first partial boundary 200BAP1 and the third partial boundary 100BAP3. The first sensing line 251, the second sensing line 252, the third sensing line 253, and the fourth sensing line 254 may be sequentially arranged in a direction away from the first partial boundary 200BAP1. The first sensing line 251 may include the first portion 251P1, the second portion 251P2, and the third portion 251P3, and the second sensing line 252 may include the fourth portion 252P1, the fifth portion 252P2, and the sixth portion 252P3.

The first portion 251P1, the third portion 251P3, the fourth portion 252P1, and the sixth portion 252P3 may be formed in the first conductive layer 200-2 (refer to FIG. 6), and the second portion 251P2 and the fifth portion 252P2 may be formed in the second conductive layer 200-4 (refer to FIG. 6).

The second portion 251P2 and the fifth portion 252P2 may be disposed between the first partial boundary 200BAP1 and the third partial boundary 100BAP3 and overlap the active area 100A (refer to FIG. 3) of the display panel 100 (refer to FIG. 3).

Hereinafter, the second portion 251P2 is referred to as a first connection portion 251P2 of the first sensing line 251, and the fifth portion 252P2 is referred to as a second connection portion 252P2 of the second sensing line 252. For example, one portion of the third sensing line 253 overlapping the active area 100A (refer to FIG. 3) is referred to as a third connection portion 253P2, and one portion of the fourth sensing line 254 overlapping the active area 100A (refer to FIG. 3) is referred to as a fourth connection portion 254P2.

The second sensing line 252 may be connected to one sensing electrode, which is more away from the sensing pads 160 (refer to FIG. 3) than another sensing electrode connected to the first sensing line 251. Thus, the second sensing line 252 may have a length greater than that of the first sensing line 251. The second connection portion 252P2 may have a length less than that of the first connection portion 251P2 and a resistance value less than that of the first connection portion 251P2. Thus, the difference between a total resistance value of the first sensing line 251 and a total resistance value of the second sensing line 252 may be reduced by the first connection portion 251P2 and the second connection portion 252P2.

Figure 8B:
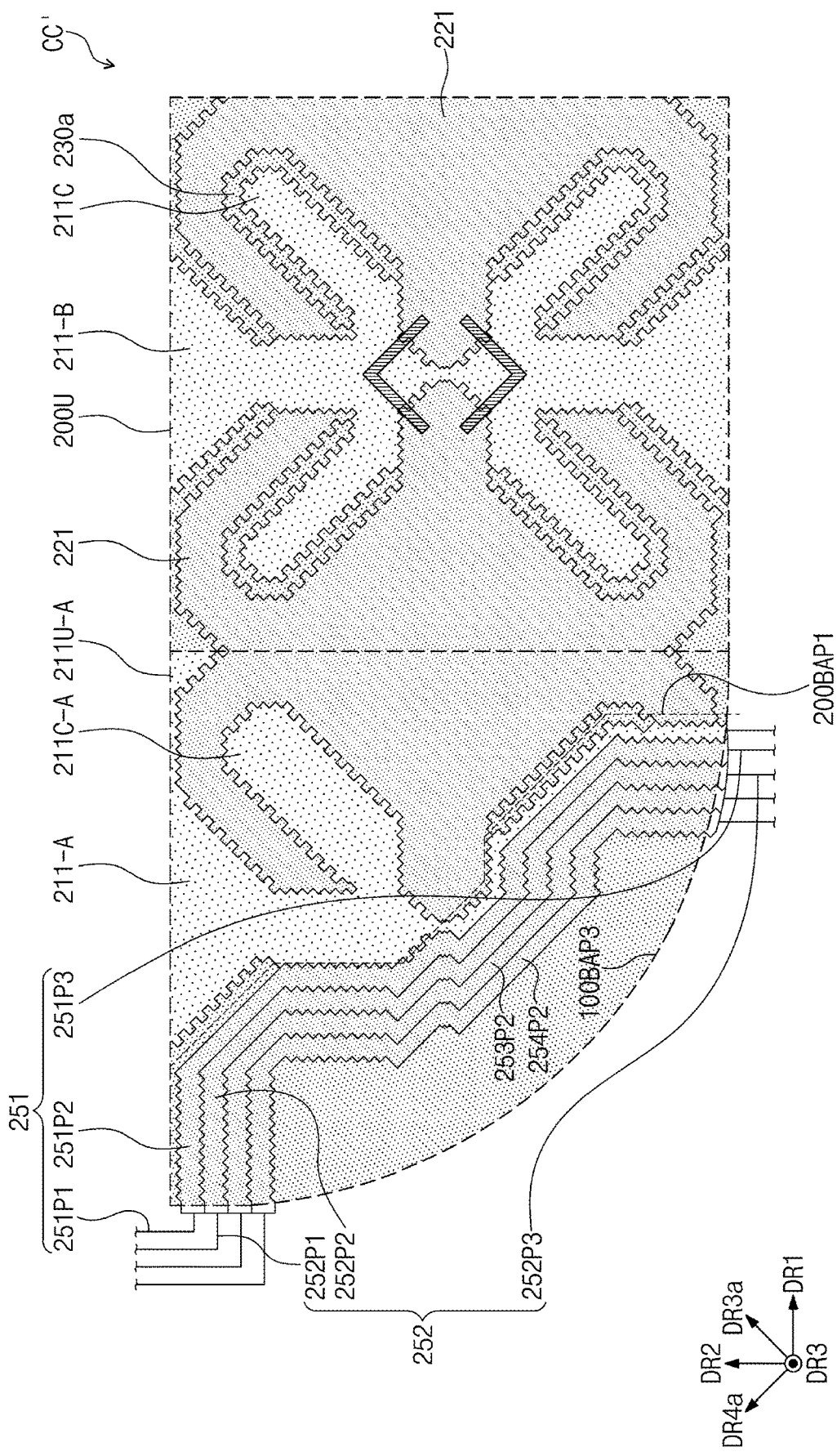
FIG. 8B is an enlarged plan view of area CC' in FIG. 5 illustrating another example embodiment of the sensing lines and the sensing electrodes of FIG. 5.

FIG. 8B is an enlarged plan view of area CC' in FIG. 5 illustrating another example embodiment of the sensing lines and the sensing electrodes of FIG. 5.

Referring to FIG. 8B, a sensing unit 211U-A adjacent to the first partial boundary 200BAP1 may have a size less than that of another sensing unit 200U. A portion of dummy patterns in the sensing unit 211U-A may be omitted to reduce a sensing sensitivity between the sensing unit 211U-A and the sensing unit 200U. Thus, an area occupied by a first sensing pattern 211-A in the sensing unit 211U-A may increase more than a case when the dummy pattern is not omitted. As a result, the reduced sensing sensitivity in the sensing unit 211U-A may be compensated.

Figure 9:
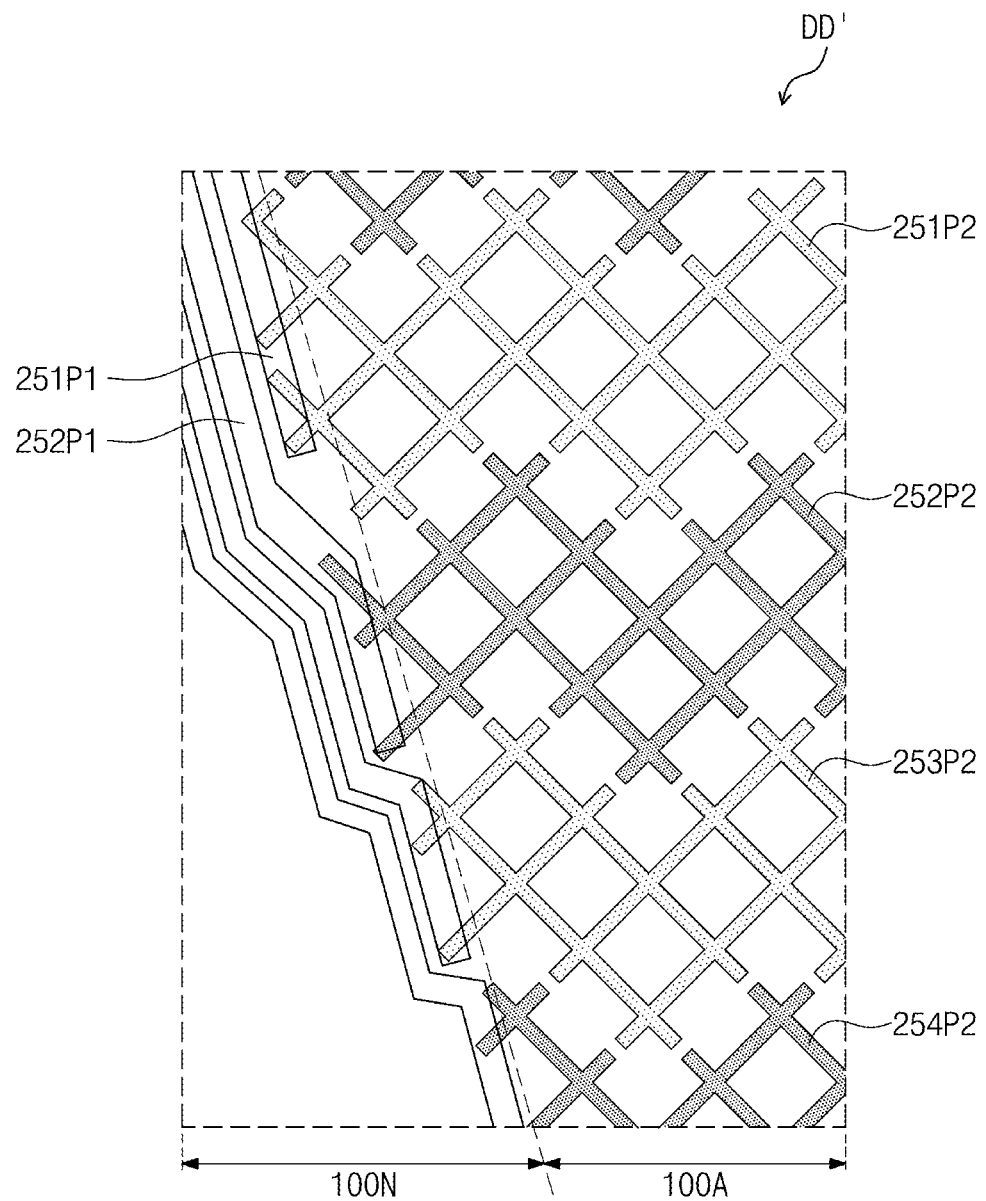
FIG. 9 is an enlarged plan view of area DD' of FIG. 8A.

For example, a first dummy pattern 230a may be disposed between a first sensing pattern 211-B and a second sensing pattern 221 in the sensing unit 200U. However, a dummy pattern may not be disposed between the second sensing pattern 221 and a third portion 211C-A of the first sensing pattern 211-A in the sensing unit 211U-A. For example, the first sensing pattern 211-A may extend to the second sensing pattern 221 without any dummy pattern between the second sensing pattern 221 and the third portion 211C-A of the first sensing pattern 211-A in the sensing unit 211U-A. Thus, the third portion 211C-A of the first sensing pattern 211-A may have a size greater than that of a third portion 211C of a first sensing pattern 211-B FIG. 9 is an enlarged plan view of area DD' of FIG. 8A. FIG. 10 is an enlarged plan view of area EE' of FIG. 8A.

Referring to FIGS. 9 and 10, each of the first, second, third, and fourth connection portions 251P2, 252P2, 253P2, and 254P2 overlapping the active area 100A may have a mesh structure (e.g., lattice structure). Thus, although the first, second, third, and fourth connection portions 251P2, 252P2, 253P2, and 254P2 overlap the active area 100A, a probability of the first, second, third, and fourth connection portions 251P2, 252P2, 253P2, and 254P2 being seen from the outside may be minimized due to the mesh structure thereof.

When the first sensing line 251 is described as an example, the first portion 251P1 and the third portion 251P3 may be disposed on the same layer, and the first connection portion 251P2 (e.g., second portion) may be disposed on a different layer from the same layer, on which the first portion 251P1 and the third portion 251P3 are disposed. The first portion 251P1 and the first connection portion 251P2 may be electrically connected to each other through a contact hole provided in the sensing insulation layer 200-3 (refer to FIG. 6), and the third portion 251P3 and the first connection portion 251P2 may be electrically connected to each other through a contact hole provided in the sensing insulation layer 200-3 (refer to FIG. 6).

Figure 11A:
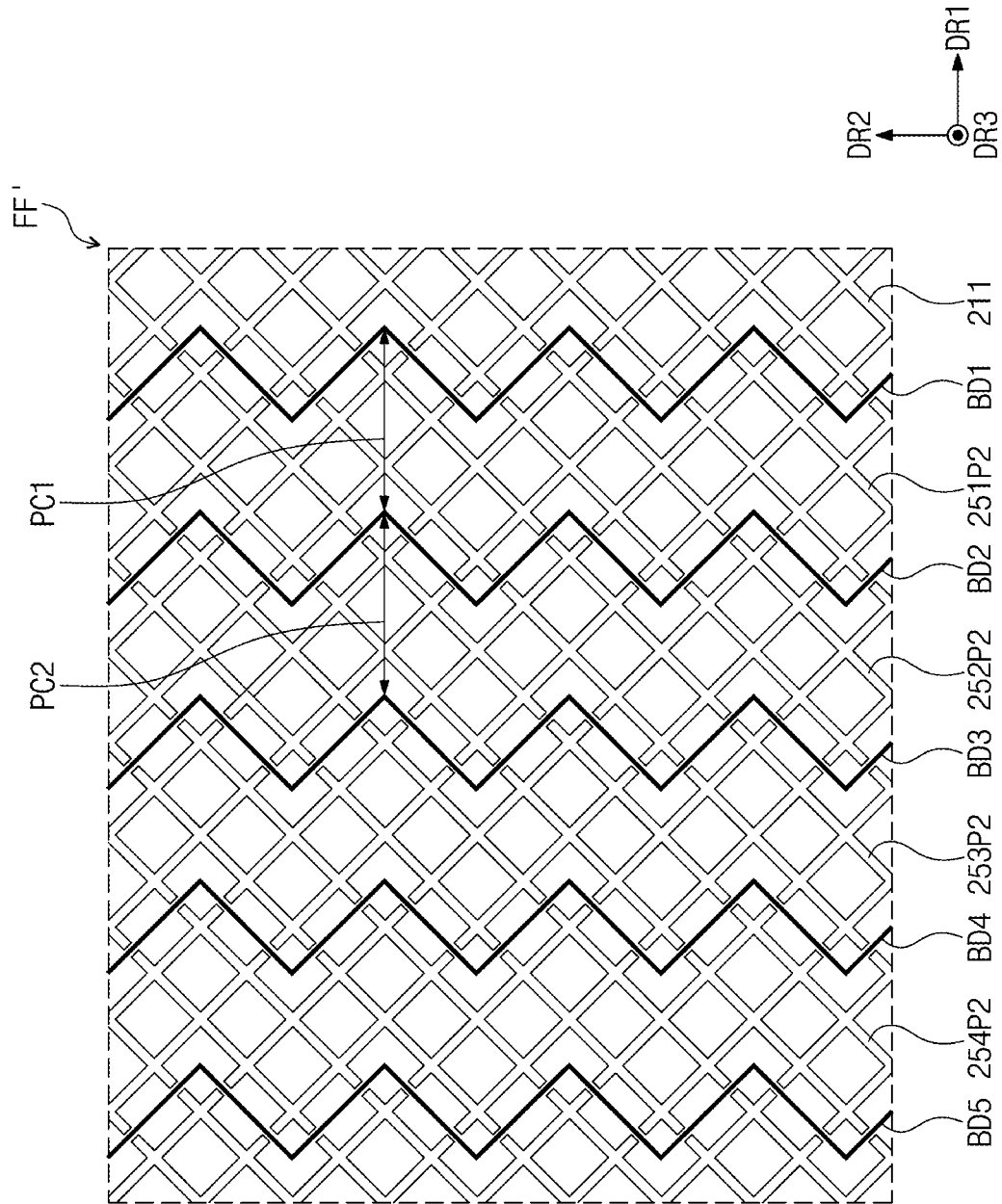
FIG. 11A is an enlarged plan view of area FF' in FIG. 8A illustrating an example embodiment of the sensing lines of FIG. 8A.

FIG. 11A is an enlarged plan view of area FF' in FIG. 8A illustrating an example embodiment of the sensing lines of FIG. 8A.

Referring to FIG. 11A, boundaries BD1, BD2, BD3, BD4, and BD5 are illustrated by a solid line to clearly illustrate the boundaries BD1, BD2, BD3, BD4, and BD5 between the first sensing pattern 211 and the first, second, third, and fourth connection portions 251P2, 252P2, 253P2, and 254P2.

In an example embodiment, pitches between the boundaries BD1, BD2, BD3, BD4, and BD5 may be the same as each other. For example, a first pitch PC1 between the first boundary BD1 and the second boundary BD2 may be the same as a second pitch PC2 between the second boundary BD2 and the third boundary BD3. The first connection portion 251P2 may have a width corresponding to the first pitch PC1, and the second connection portion 252P2 may have a width corresponding to the second pitch PC2. Thus, the width of the first connection portion 251P2 may be the same as that of the second connection portion 252P2.

Figure 11B:
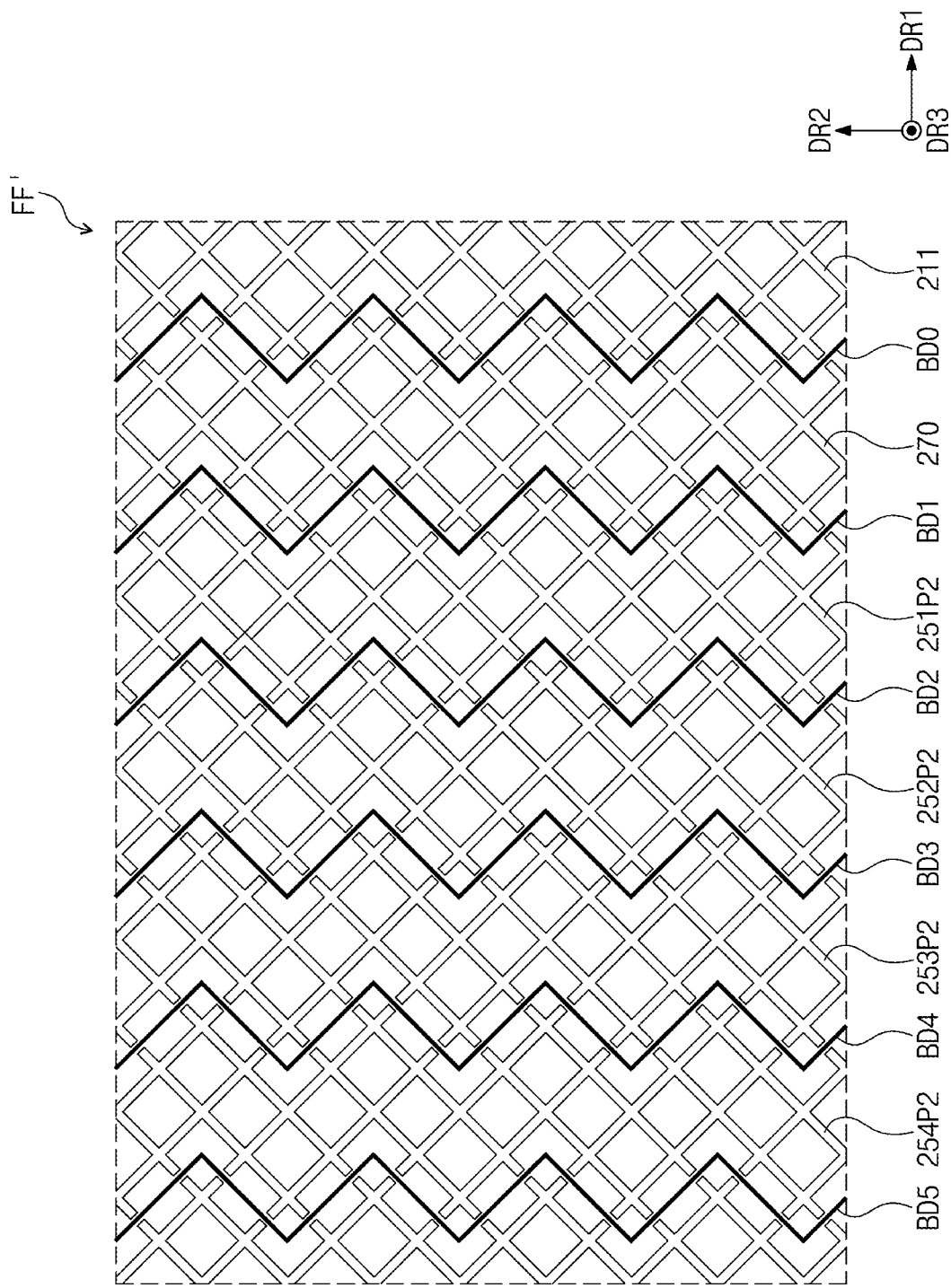
FIG. 11B is an enlarged plan view of an area corresponding to area FF' in FIG. 8A illustrating another example embodiment of the sensing lines of FIG. 8A.

FIG. 11B is an enlarged plan view of an area corresponding to area FF' in FIG. 8A illustrating another example embodiment of the sensing lines of FIG. 8A.

Referring to FIG. 11B, a dummy electrode 270 may be further provided between the first connection portion 251P2 and the first sensing pattern 211. The dummy electrode 270 may be spaced apart from the first sensing pattern 211 by a boundary BD0 therebetween.

The dummy electrode 270, as a floating electrode, may not be electrically connected to the first connection portion 251P2 and the first sensing pattern 211. A parasitic capacitance generated between the first sensing pattern 211 and the first connection portion 251P2 may be reduced by the dummy electrode 270.

For example, the dummy electrode 270 is exemplarily disposed only between the first connection portion 251P2 and the first sensing pattern 211 in FIG. 11B, but example embodiments are not limited thereto. For example, a dummy electrode may be further provided between the first connection portion 251P2 and the second connection portion 252P2.

Figure 11C:
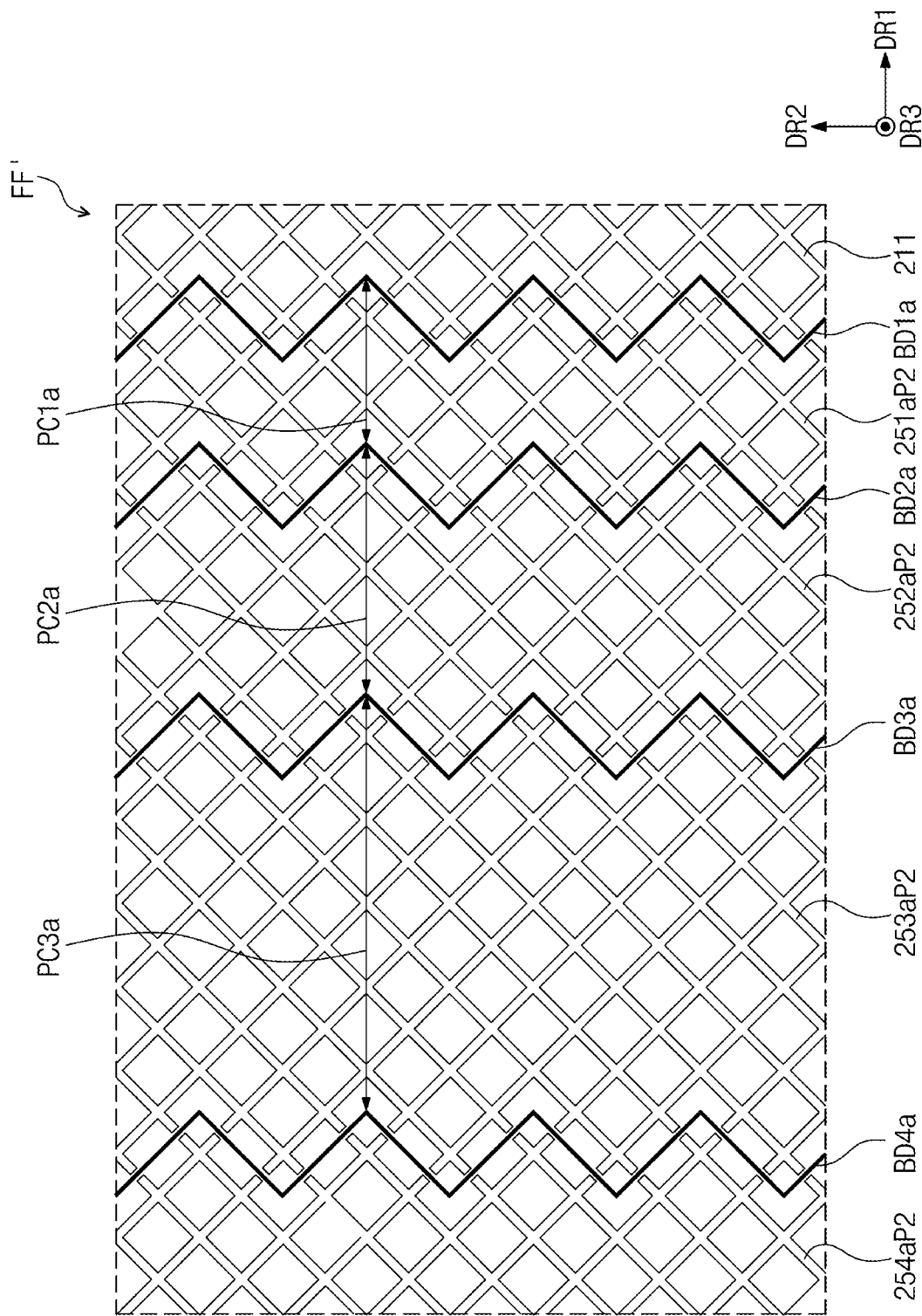
FIG. 11C is an enlarged plan view of an area corresponding to area FF' in FIG. 8A illustrating another example embodiment of the sensing lines of FIG. 8A.

FIG. 11C is an enlarged plan view of an area corresponding to area FF' in FIG. 8A illustrating another example embodiment of the sensing lines of FIG. 8A.

Referring to FIG. 11C, pitches between boundaries BD1a, BD2a, BD3a, and BD4a may be different from each other. A first pitch PC1a between the first boundary BD1a and the second boundary BD2a, a second pitch PC2a between the second boundary BD2a and the third boundary BD3a, and a third pitch PC3a between the third boundary BD3a and the fourth boundary BD4a may be defined. The third pitch PC3a may be greater than each of the first pitch PC1a and the second pitch PC2a, and the second pitch PC2a may be greater than the first pitch PC1a.

A width of a first connection portion 251aP2 may correspond to the first pitch PC1a, a width of a second connection portion 252aP2 may correspond to the second pitch PC2a, and a width of a third connection portion 253aP2 may correspond to the third pitch PC3a. Thus, the widths of the first, second, third, and fourth connection portions 251aP2, 252aP2, 253aP2, and 254aP2 may be different from each other.

The connection portion may have a width and a resistance value that are inversely proportional to each other. Thus, a resistance value of the first connection portion 251aP2 may be greater than that of the second connection portion 252aP2, and the width of the first connection portion 251aP2 may be less than that of the second connection portion 252aP2. According to an example embodiment, the difference between total resistance values of the first, second, third, and fourth sensing lines 251, 252, 253, and 254 (refer to FIG. 5) may be reduced by adjusting the widths of the first, second, third, and fourth connection portions 251aP2, 252aP2, 253aP2, and 254aP2.

Figure 11D:
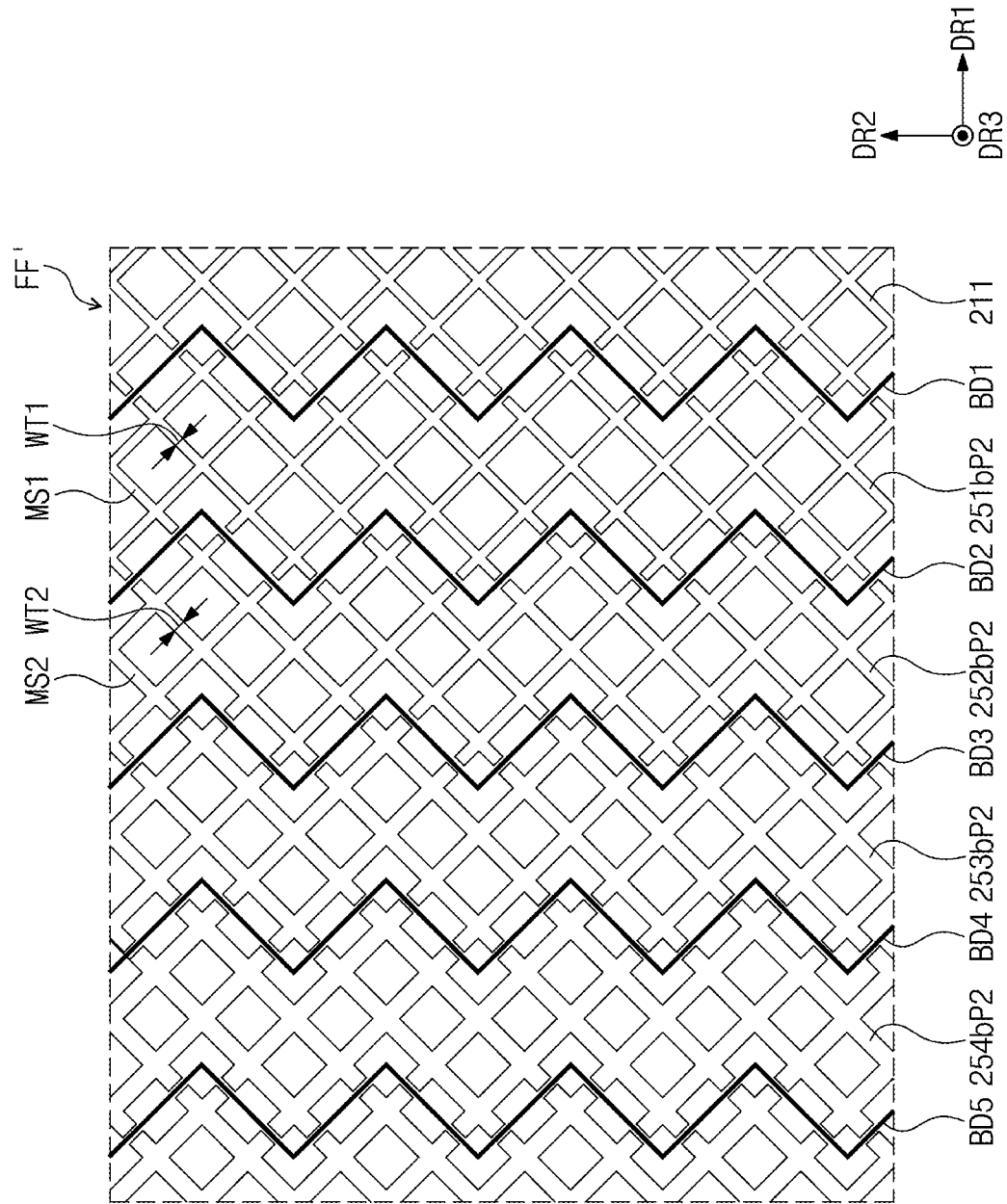
FIG. 11D is an enlarged plan view of an area corresponding to area FF' in FIG. 8A illustrating another example embodiment of the sensing lines of FIG. 8A.

FIG. 11D is an enlarged plan view of an area corresponding to area FF' in FIG. 8A illustrating another example embodiment of the sensing lines of FIG. 8A.

Referring to FIG. 11D, a first sensing pattern 211 and first, second, third, and fourth connection portions 251bP2, 252bP2, 253bP2, and 254bP2 are illustrated. Each of the first sensing pattern 211 and the first, second, third, and fourth connection portions 251bP2, 252bP2, 253bP2, and 254bP2 may have a mesh structure (e.g., lattice structure).

Mesh lines of the first, second, third, and fourth connection portions 251bP2, 252bP2, 253bP2, and 254bP2 may have widths different from each other. For example, a width WT1 of a mesh line MS1 constituting the first connection portion 251bP2 may be less than a width WT2 of a mesh line MS2 of the second connection portion 252bP2. In this case, the first connection portion 251bP2 may have a resistance value greater than that of the second connection portion 252bP2. Thus, the difference between a total resistance value of the first sensing line 251 (refer to FIG. 5) and a total resistance value of the second sensing line 252 (refer to FIG. 5) may be reduced due to the difference between the widths of the first connection portion 251bP2 and the second connection portion 252bP2.

Figure 12:
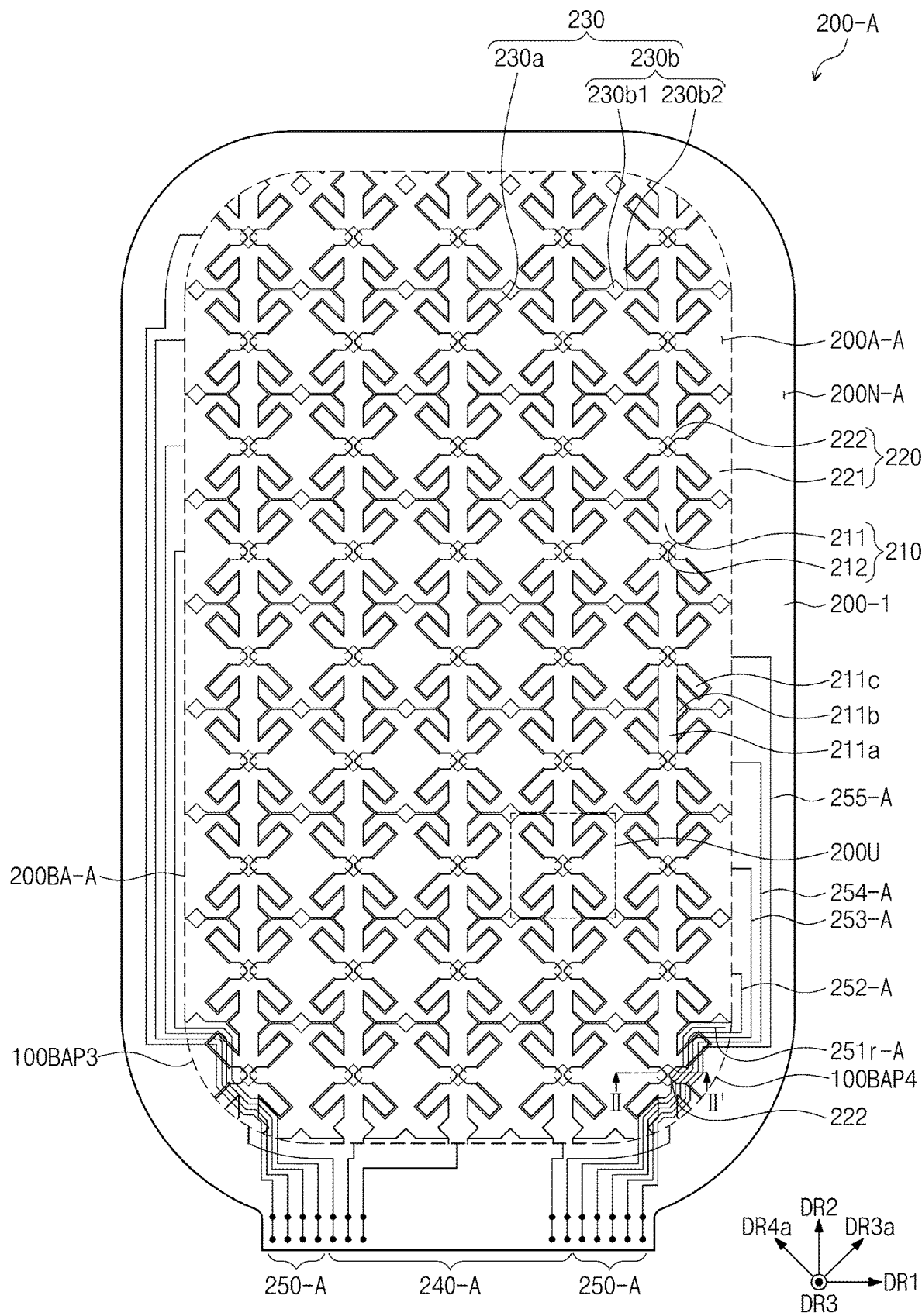
FIG. 12 is a plan view of another example embodiment of the sensor of FIG. 2.
Figure 13:
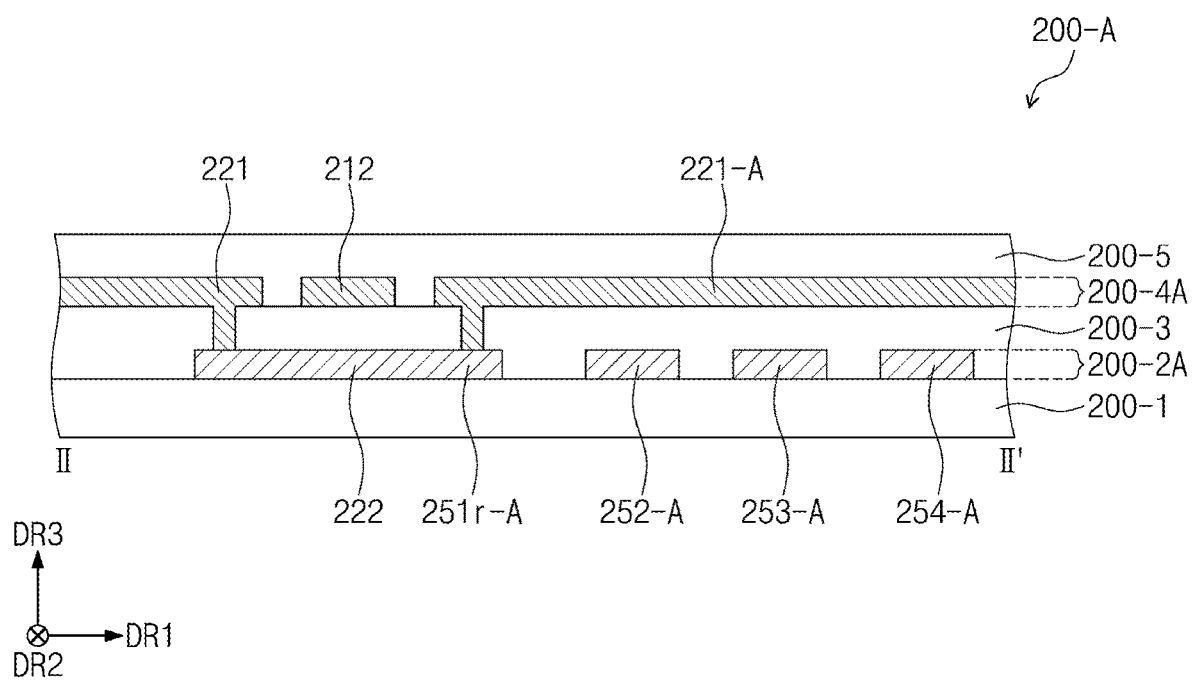
FIG. 13 is a cross-sectional view taken along line II-II' of FIG. 12.

FIG. 12 is a plan view of another example embodiment of the sensor of FIG. 2. FIG. 13 is a cross-sectional view taken along line II-II' of FIG. 12.

Referring to FIGS. 3, 12, and 13, an active area 200A-A and a peripheral area 200N-A may be defined on a sensor 200-A. In an example embodiment, the active area 200A-A may have the substantially same area as that of the active area 100A of the display panel 100. Thus, a boundary 200BA-A between the active area 200A-A and the peripheral area 200N-A may correspond to the boundary 100BA of the display panel 100.

One portion of each of partial sensing lines 251r-A, 252-A, 253-A, 254-A, and 255-A of sensing lines 240-A and 250-A may be disposed in the active area 100A of the display panel 100.

The one portion of each of the sensing lines 251r-A, 252-A, 253-A, 254-A, and 255-A may be disposed in the active area 200A-A. In a cross-sectional view, the one portion of each of the sensing lines 251r-A, 252-A, 253-A, 254-A, and 255-A may be disposed below the first sensing patterns 211 and the second sensing patterns 221. For example, the one portion of each of the sensing lines 251r-A, 252-A, 253-A, 254-A, and 255-A is disposed at the different level from the first sensing patterns 211 and the second sensing patterns 221. For example, the one portion of each of the sensing lines 251r-A, 252-A, 253-A, 254-A, and 255-A may be disposed below the first sensing patterns 211 and the second sensing patterns 221.

Since the one portion of each of the sensing lines 251r-A, 252-A, 253-A, 254-A, and 255-A are disposed in a different layer from the first sensing patterns 211 and the second sensing patterns 221, a size of each of the first sensing patterns 211 and the second sensing patterns 221 may not be reduced in a specific area. The specific area represents an area on which the one portion of each of the sensing lines 251r-A, 252-A, 253-A, 254-A, and 255-A are disposed. Thus, although the one portion of each of the sensing lines 251r-A, 252-A, 253-A, 254-A, and 255-A are disposed in the active area 200A-A, a variation of a sensing sensitivity of the sensor 200-A may be minimized, because the size of each of the first sensing patterns 211 and the second sensing patterns 221 is not reduced in the specific area. The one portion of each of the sensing lines 251r-A, 252-A, 253-A, 254-A, and 255-A may be referred to as connection portions.

A first conductive layer 200-2A may include second connection patterns 222 and the sensing lines 251r-A, 252-A, 253-A, 254-A, and 255-A. A second conductive layer 200-4A may include first sensing patterns 211, second sensing patterns 221 and 221-A, and first connection patterns 212. For example, the first sensing patterns 211, the second sensing patterns 221 and 221-A, and the first connection patterns 212 may be disposed on a first layer, e.g., a sensing insulation layer 200-3, and the second connection patterns 222 and the sensing lines 251r-A, 252-A, 253-A, 254-A, and 255-A may be disposed on a second layer different from the first layer, e.g., a base insulation layer 200-1.

Figure 14:
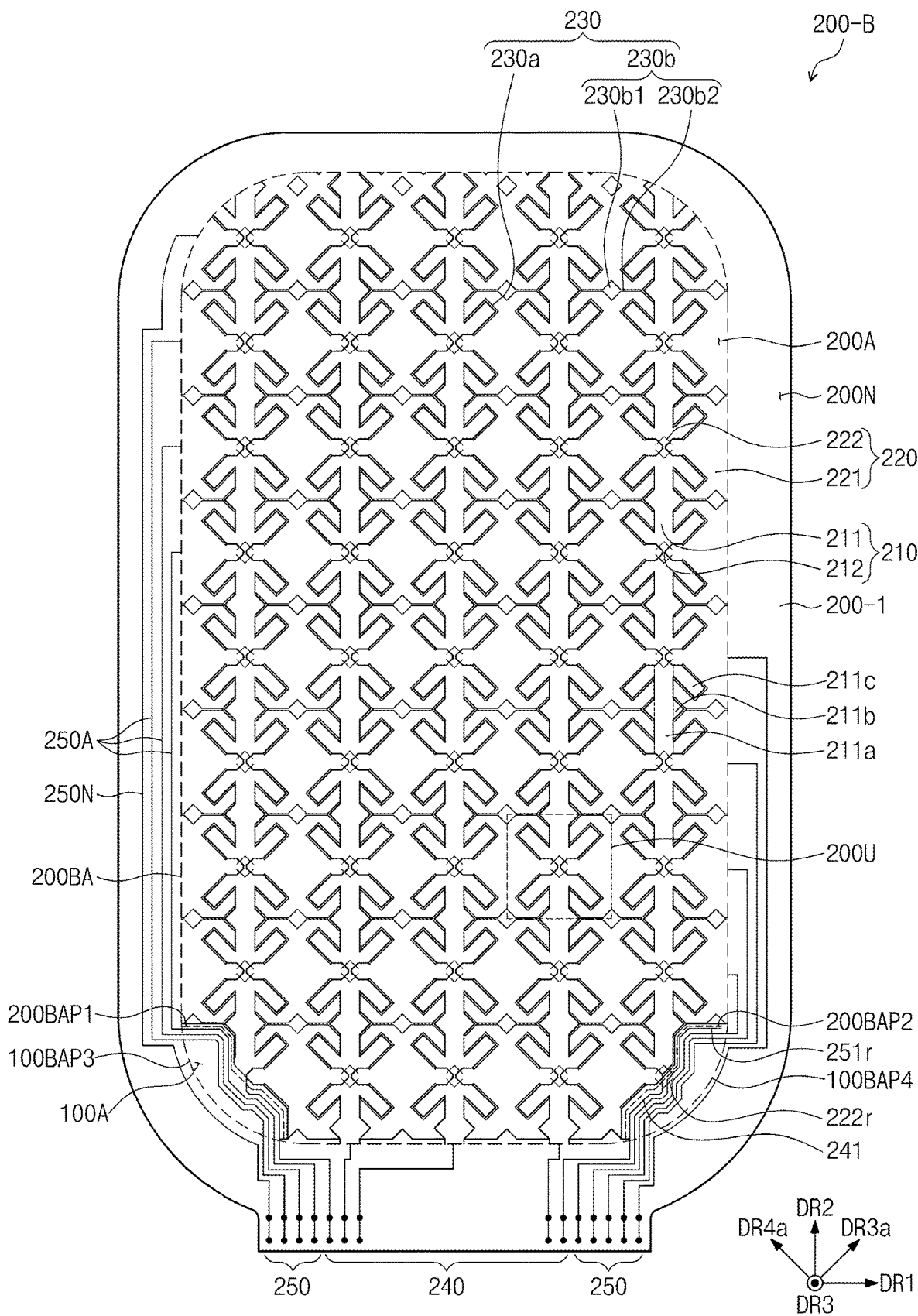
FIG. 14 is a plan view of another example embodiment of the sensor of FIG. 2.

FIG. 14 is a plan view of another example embodiment of the sensor of FIG. 2.

Referring to FIGS. 3 and 14, a sensor 200-B may include first sensing electrodes 210, second sensing electrodes 220, dummy patterns 230, and sensing lines 240 and 250.

According to an example embodiment, partial sensing lines 250A (hereinafter, referred to as first sensing lines) of the sensing lines 240 and 250 may overlap the active area 100A of the display panel 100. When viewed in plane, one portion of each of the partial sensing lines 250A may be disposed between a boundary 100BA and first and second sensing electrodes 210 and 220. Another partial sensing line 250N (hereinafter, referred to as a second sensing line) of the sensing lines 240 and 250 may overlap the peripheral area 100N of the display panel 100. For example, one portion of the second sensing line 250N may be spaced apart from the one portion of each of the first sensing lines 250A by a third partial boundary 100BAP3 therebetween.

According to an example embodiment, the partial sensing lines of the sensing lines 240 and 250 may be formed to overlap the active area 100A of the display panel 100. Thus, although a size of the peripheral area 100N of the display panel 100 is reduced, an area on which the sensing lines 240 and 250 are disposed may be secured.

According to the example embodiment, the one portion of the sensing line, which is electrically connected to the sensing electrode, may overlap the active area of the display panel. Although the size of the peripheral area of the display panel is reduced, the area on which the sensing line is disposed may secure a sufficient area by forming the one portion of the sensing line to overlap the active area of the display panel. For example, as the resistance values of the portions of the sensing lines, which overlap the active area of the display panel, are adjusted, the difference between the resistance values of the sensing lines may be reduced.

Although the example embodiments of the present disclosure have been described, it is understood that the present disclosure should not be limited to these example embodiments but various changes and modifications can be made by one ordinary skilled in the art within the spirit and scope of the present disclosure as hereinafter claimed. Hence, the real protective scope of the present disclosure shall be determined by the technical scope of the accompanying claims.

What is claimed is:

1. An electronic device comprising:
a display panel having an active area in which a plurality of pixels are disposed and a peripheral area disposed around the active area;
a plurality of sensing electrodes disposed in the active area; and
a first signal line connected to one of the plurality of sensing electrodes, the first signal line comprising a first portion disposed in the peripheral area, a second portion extending from the first portion and disposed in the active area, and a third portion extending from the second portion and disposed in the peripheral area and spaced apart from the first portion,
wherein the second portion of the first signal line in the active area is connected between the first portion and the third portion of the first signal line in the peripheral area.

2. The electronic device of claim 1, further comprising a second signal line connected to another of the plurality of sensing electrodes and comprising a fourth portion disposed in the peripheral area, a fifth portion extending from the fourth portion and disposed in the active area, and a sixth portion extending from the fifth portion and disposed in the peripheral area,
wherein the fifth portion of the second signal line in the active area is closer to the peripheral area than the second portion of the first signal line in the active area when viewed in plane.

3. The electronic device of claim 2, wherein the second portion of the first signal line in the active area has a length greater than that of the fifth portion of the second signal line in the active area.

4. The electronic device of claim 2, wherein the second portion of the first signal line in the active area has a width less than that of the fifth portion of the second signal line in the active area.

5. The electronic device of claim 2, wherein the second portion of the first signal line in the active area has resistance greater than that of the fifth portion of the second signal line in the active area.

6. The electronic device of claim 2, wherein each of the second portion of the first signal line in the active area and the fifth portion of the second signal line in the active area has a mesh structure.

7. The electronic device of claim 6, wherein a mesh line of the second portion of the first signal line in the active area has a width equal to or less than that of a mesh line of the fifth portion of the second signal line in the active area.

8. The electronic device of claim 1, wherein each of the plurality of sensing electrodes comprises a plurality of sensing patterns and a plurality of connection patterns, and the second portion of the first signal line in the active area and the plurality of sensing patterns are disposed on a same layer and comprise a same material.

9. The electronic device of claim 8, further comprising a dummy electrode disposed between the second portion of the first signal line in the active area and the plurality of sensing patterns.

10. The electronic device of claim 1, wherein each of the plurality of sensing electrodes comprises a plurality of sensing patterns and a plurality of connection patterns, and the second portion of the first signal line in the active area is disposed at a different level from the plurality of sensing patterns in a cross-sectional view.

11. The electronic device of claim 1, wherein a boundary is disposed between the active area and the peripheral area, and the boundary comprises a partially curved boundary.

12. The electronic device of claim 11, wherein the second portion of the first signal line in the active area is spaced apart from the peripheral area by the partially curved boundary therebetween when viewed in plane.

13. The electronic device of claim 11, further comprising a second signal line connected to another of the plurality of sensing electrodes and spaced apart from the second portion by the partially curved boundary therebetween.

14. The electronic device of claim 1, wherein the display panel is bent with respect to: a first bending axis extending in a first direction; a second bending axis extending in the first direction and spaced apart from the first bending axis in a second direction intersecting the first direction; a third bending axis extending in the second direction; and a fourth bending axis extending in the second direction and spaced apart from the third bending axis in the first direction,
wherein the active area overlaps the first bending axis, the second bending axis, the third bending axis, and the fourth bending axis when viewed in plane.

15. An electronic device comprising:
a display panel having an active area configured to display an image, a peripheral area disposed around the active area, and a partially curved boundary between the active area and the peripheral area; and
a sensor comprising a plurality of sensing electrodes disposed in the active area and a plurality of signal lines electrically connected to the plurality of sensing electrodes, respectively,
wherein the plurality of signal lines comprise a first signal line electrically connected to one of the plurality of sensing electrodes, wherein:
the first signal line comprises a first extension portion disposed in the peripheral area and connected to the one of the plurality of sensing electrodes, a second extension portion disposed in the peripheral area and spaced apart from the first extension portion, and a connection portion disposed in the active area and connected between the first extension portion in the peripheral area and the second extension portion in the peripheral area, and
the connection portion of the first signal line is spaced apart from the peripheral area by the partially curved boundary therebetween when viewed in plane.

16. The electronic device of claim 15, wherein:
the plurality of signal lines further comprise a second signal line electrically connected to another of the plurality of sensing electrodes,
a connection portion of the second signal line is disposed between the partially curved boundary and the connection portion of the first signal line when viewed in plane, and
the connection portion of the second signal line has a resistance value less than that of the connection portion of the first signal line.

17. The electronic device of claim 16, wherein the connection portion of the first signal line has a length greater than that of the connection portion of the second signal line.

18. The electronic device of claim 16, wherein the connection portion of the first signal line has a width less than that of the connection portion of the second signal line.

19. The electronic device of claim 16, wherein each of the connection portion of the first signal line and the connection portion of the second signal line has a mesh structure, and a mesh line of the connection portion of the first signal line has a width equal to or less than that of a mesh line of the connection portion of the second signal line.

20. The electronic device of claim 16, wherein each of the plurality of sensing electrodes comprises a plurality of sensing patterns and a plurality of connection patterns, and the connection portion of the first signal line, the connection portion of the second signal line, and the plurality of sensing electrodes are disposed on a same layer or are disposed at different levels in a cross-sectional view.

* * * * *